United States Patent
Gross et al.

(10) Patent No.: US 9,694,992 B2
(45) Date of Patent: Jul. 4, 2017

(54) MULTIPLE DOCK STATION FOR PNEUMATIC TRANSPORT SYSTEM

(71) Applicants: Daniel Robert Gross, Highlands Ranch, CO (US); David Warren Parish, Denver, CO (US); Daniel John Serafin, Thornton, CO (US)

(72) Inventors: Daniel Robert Gross, Highlands Ranch, CO (US); David Warren Parish, Denver, CO (US); Daniel John Serafin, Thornton, CO (US)

(73) Assignee: Translogic Corporation, Denver, CO (US)

( * ) Notice: Subject to any disclaimer, the term of this patent is extended or adjusted under 35 U.S.C. 154(b) by 0 days.

(21) Appl. No.: 14/873,834

(22) Filed: Oct. 2, 2015

(65) Prior Publication Data

US 2016/0096691 A1    Apr. 7, 2016

Related U.S. Application Data

(60) Provisional application No. 62/058,781, filed on Oct. 2, 2014, provisional application No. 62/189,366, filed on Jul. 7, 2015.

(51) Int. Cl.
| | |
|---|---|
| *B65G 51/26* | (2006.01) |
| *B65G 51/34* | (2006.01) |
| *B65G 51/18* | (2006.01) |
| *B65G 51/46* | (2006.01) |
| *B65G 51/44* | (2006.01) |

(52) U.S. Cl.
CPC ............ *B65G 51/34* (2013.01); *B65G 51/18* (2013.01); *B65G 51/26* (2013.01); *B65G 51/44* (2013.01); *B65G 51/46* (2013.01); *B65G 2201/02* (2013.01); *B65G 2203/0208* (2013.01); *B65G 2203/046* (2013.01)

(58) Field of Classification Search
CPC ........ B65G 51/24; B65G 51/26; B65G 51/28; B65G 51/30; B65G 51/32; B65G 53/56
USPC ........................................... 406/182
See application file for complete search history.

(56) References Cited

U.S. PATENT DOCUMENTS

| | | | | |
|---|---|---|---|---|
| 1,733,026 A | * | 10/1929 | McGuinness | B65G 51/40 406/1 |
| 1,784,967 A | * | 12/1930 | McGuinness | B65G 51/32 406/4 |
| 3,260,474 A | * | 7/1966 | Geist | B65G 51/26 406/63 |
| 3,337,159 A | * | 8/1967 | Hoehmann | B65G 47/5104 406/182 |
| 3,536,098 A | | 10/1970 | Cunningham | |

(Continued)

FOREIGN PATENT DOCUMENTS

| | | |
|---|---|---|
| EP | 0454662 A1 | 10/1991 |
| EP | 1238928 A2 | 9/2002 |

(Continued)

*Primary Examiner* — Joseph Dillon, Jr.
(74) *Attorney, Agent, or Firm* — Russell T Manning; Marsh Fischmann & Breyfogle LLP

(57) ABSTRACT

Provided herein is a pneumatic tube system station having a rotating carriage with multiple carrier ports. The multiple carrier ports allow for receiving multiple carriers and/or staging multiple carries for dispatch. In one arrangement, one or more carriers may be securely maintained within the station while permitting users to continue utilizing the station.

19 Claims, 21 Drawing Sheets

(56) References Cited

U.S. PATENT DOCUMENTS

| | | | |
|---|---|---|---|
| 3,627,231 A | 12/1971 | Kalthoff | |
| 3,674,123 A | 7/1972 | Lewis et al. | |
| 3,711,038 A | 1/1973 | Van Otteren | |
| 3,829,042 A | 8/1974 | Torochkov et al. | |
| 3,892,372 A | 7/1975 | Hauber | |
| 3,894,372 A | 7/1975 | Roberts et al. | |
| 4,037,805 A | 7/1977 | Alexandrov et al. | |
| 4,058,274 A | 11/1977 | Hochradel et al. | |
| 4,084,770 A | 4/1978 | Warmann | |
| 4,395,164 A | 7/1983 | Beltrop et al. | |
| 4,437,797 A * | 3/1984 | Kardinal | B65G 51/32 406/110 |
| 4,437,799 A | 3/1984 | Liu et al. | |
| 4,442,865 A | 4/1984 | Shigeo | |
| 4,516,888 A * | 5/1985 | Kardinal | B65G 51/24 406/182 |
| 4,529,335 A * | 7/1985 | Hilbert | B65G 51/32 406/1 |
| 5,192,170 A * | 3/1993 | Lang | B65G 51/28 406/147 |
| 5,217,328 A | 6/1993 | Lang | |
| 5,354,152 A | 10/1994 | Reinhardt et al. | |
| 5,735,644 A | 4/1998 | Grosswiller et al. | |
| 5,816,443 A | 10/1998 | Bustos | |
| 5,864,485 A | 1/1999 | Hawthorne et al. | |
| 5,966,309 A | 10/1999 | O'Bryan et al. | |
| 3,030,152 A | 2/2000 | Steele | |
| 6,146,057 A | 11/2000 | Gromley et al. | |
| 6,173,202 B1 | 1/2001 | Eppstein | |
| 6,202,004 B1 | 3/2001 | Valerino, Sr. | |
| 6,477,442 B1 * | 11/2002 | Valerino, Sr. | B65G 51/34 414/730 |
| 6,659,693 B1 | 12/2003 | Perkins et al. | |
| 6,702,150 B2 * | 3/2004 | Sumetzberger | B65G 51/32 221/265 |
| 6,712,561 B1 | 3/2004 | Valerino, Sr. et al. | |
| 7,039,495 B1 | 5/2006 | Conboy et al. | |
| 7,243,002 B1 * | 7/2007 | Hoganson | B65G 51/44 406/4 |
| 7,424,340 B2 * | 9/2008 | Owens | B65G 51/46 406/182 |
| 7,751,930 B2 | 7/2010 | Valerino, Sr. | |
| 8,029,212 B2 | 10/2011 | Valerino, Sr. | |
| 8,116,906 B2 * | 2/2012 | Valerino, Sr. | G06Q 10/00 700/226 |
| 8,322,601 B1 * | 12/2012 | Benore | G07G 1/0018 109/19 |
| 8,382,401 B2 * | 2/2013 | Castro | B65G 51/20 406/195 |
| 8,447,427 B2 * | 5/2013 | Hoganson | B65G 51/44 700/225 |
| 8,491,225 B2 * | 7/2013 | Valerino, Sr. | B65B 31/046 406/110 |
| 8,565,915 B2 * | 10/2013 | Dillon | G06Q 10/047 700/224 |
| 8,700,207 B2 * | 4/2014 | Valerino, Sr. | G06Q 10/00 700/229 |
| 8,721,231 B2 * | 5/2014 | Barrios | B65G 43/00 406/11 |
| 8,793,014 B2 * | 7/2014 | Hoganson | B65G 51/44 700/228 |
| 8,973,338 B2 * | 3/2015 | Terzini | B65G 51/20 406/191 |
| 9,139,383 B2 * | 9/2015 | Hoganson | B65G 51/36 |
| 9,221,626 B2 * | 12/2015 | Hoganson | B65G 51/44 |
| 9,309,063 B2 * | 4/2016 | Soerensen | B65G 51/02 |
| 9,352,914 B2 * | 5/2016 | Le | B65G 51/32 |
| 2002/0140223 A1 * | 10/2002 | Sumetzberger | B65G 51/32 285/119 |
| 2007/0173972 A1 * | 7/2007 | Owens | B65G 51/46 700/232 |
| 2008/0292414 A1 * | 11/2008 | Owens | B65G 51/32 406/182 |
| 2012/0195698 A1 * | 8/2012 | Soerensen | B65G 51/02 406/34 |
| 2013/0279993 A1 | 10/2013 | Castro et al. | |
| 2014/0330428 A1 * | 11/2014 | Wolfe | B65G 51/44 700/226 |
| 2015/0025675 A1 | 1/2015 | Valerino, Sr. | |

FOREIGN PATENT DOCUMENTS

| | | |
|---|---|---|
| EP | 1973822 A2 | 10/2008 |
| FR | 2502229 A1 | 9/1982 |
| JP | 51-8138 A | 7/1976 |

* cited by examiner

MULTIPLE DOCK STATION FOR PNEUMATIC TRANSPORT SYSTEM

CROSS REFERENCE

The present application claims the benefit of the filing dates of U.S. Provisional Application No. 62/058,781 having a filing date of Oct. 2, 2014 and U.S. Provisional Application No. 62/189,366 having a filing date of Jul. 7, 2015, the entire contents of both of which are incorporated herein by reference.

FIELD

The present disclosure relates to sending and receiving stations for use in a pneumatic tube transport systems. More particularly, the present disclosure relates to carrier stations that include multiple docks for holding a plurality of incoming carriers and/or carriers staged for dispatch.

BACKGROUND

Pneumatic tube systems (PTS) are a well-known means for the automated transport of materials between, for example, an origination location and any one of a plurality of destination locations. A typical PTS includes a number of pneumatic tubes interconnected in a network to transport carriers between user stations. Various air sources/blowers and transfer units provide the force and path control means, respectively, for moving the carriers through and from tube-to-tube within the system. Simply stated, pressure differentials between two ends of the carrier, as supplied by the air source(s), are employed to propel carriers through the pneumatic tubes. Generally, transfer units move or divert pneumatic carries from a first pneumatic tube to one of a plurality of additional pneumatic tubes to route pneumatic carriers between locations, or stations, in the PTS.

In a PTS, the pneumatic tubes form a network of pathways that may be arranged in any manner. Most systems include a number of individual stations that are interconnected to the network by a single pneumatic tube. The single pneumatic tube transports carriers to and from the station under pressure and vacuum and is typically connected to a transfer device. Such transfer devices allow for redirecting pneumatic carriers to one or more additional pneumatic tubes. In this regard, carries may be routed between different stations. In any arrangement, stations are typically disposed throughout a facility for dispatching carriers to other locations within the PTS, for receiving carriers from other locations, or both.

SUMMARY

Provided herein are carrier stations for use in a pneumatic tube system (PTS). The carrier stations are configured to securely hold a plurality of carriers received from the PTS and/or carriers staged for delivery to the PTS. While securely holding such carriers, the station remains available for receiving/sending additional carriers.

In one aspect, pneumatic tube systems, pneumatic tube stations and/or methods of using the system and stations (i.e., utilities) are provided. In these utilities, a carrier station is provided that includes a carousel/carriage arrangement having a plurality of carrier docks. Such carrier docks may have, for example, equal angular spacing about a rotational axis of the carriage. The carrier docks may each be rotated into alignment with a dispatch/receiving port (e.g., pneumatic port) to dispatch or receive a carrier. Further, the carrier docks may be rotated into alignment with an access opening in the station. When a carrier dock is aligned with the access opening, a carrier may be inserted into or removed from the carrier dock. The access opening and the pneumatic port are typically nonaligned. That is, the access opening is aligned with the first carrier dock while the pneumatic port is aligned with the second carrier dock. Further, the access opening may be sized to limit access to one carrier dock at a time to prevent removal of carriers from adjacent carrier docks. In one arrangement, radial outer portions of the carrier docks are open allowing insertion and removal of the carriers through the side of the carriage. In such an arrangement, dividers may extend between the carrier docks, further limiting access adjacent carrier docks.

In a further arrangement, the station may include an access door that at least partially covers the access opening. In such an arrangement, the access door may move between a first position that at least partially covers the access opening and a second position that exposes the access opening. In the first position, the access door may entirely cover or partially cover the access opening to prevent insertion or removal of carriers from carrier docks of the carriage. In the second position, the access door moves to a location that allows the user to insert or remove carriers from a carrier dock of the carriage that is aligned with the access opening.

The carrier docks each generally defined a substantially cylindrical space sized to receive a pneumatic carrier. Typically, a long axis of the cylindrical docks are substantially aligned with the rotational axis of the carriage. For instance, the carrier dock are vertically aligned about the central axis of the carriage. Each carrier dock includes an open upper end and an at least partially closed lower end. The open ends of each carrier dock are sized to permit passage of a pneumatic carrier there through. In one arrangement, the open ends extend through an upper rim of the carriage forming a plurality of apertures. However, this is not a requirement. In any arrangement, the open ends of each carrier dock may be positioned adjacent to the pneumatic port to send pneumatic carriers to the pneumatic tube system and receive pneumatic carriers from the pneumatic tube system. Carriers are sent and received through the open ends of the carrier docks. In contrast, users insert and remove carriers from the carrier ports through the side of the carriage. To permit insertion and removal the carriers from the side surface of the carriage, radially outward portions (i.e., relative to the rotational axis) of the carrier docks are at least partially open between their open end and closed end.

In a further arrangement, the station includes a linear actuator that is adapted to extend from a position below the carriage to position adjacent to the pneumatic port. In this regard, the linear actuator extends through a carrier dock aligned with the pneumatic port. That is, the linear actuator may extend through an aperture in the bottom surface of the aligned carrier dock. When a carrier dock is aligned with the pneumatic port, the linear actuator may extend to a position proximate to the pneumatic port to engage an incoming carrier and lower the carrier into the carrier dock. When sending a carrier, the linear actuator may engage a pneumatic carrier at the bottom end of the carrier dock and lift the carrier to the pneumatic port. In such an arrangement, the linear actuator may provide a momentum to facilitate launching of the carrier into the pneumatic tube system. When retracted, the linear actuator is in a position that allows the carriage to rotate about a central axis.

In a further arrangement, the pneumatic port may further include an in-line valve that allows for selectively drawing/exhausting air through the carriage and carrier docks (i.e., drawing air in the access opening and exhausting air through the access opening) or drawing/exhausting air through an interior of the station, which may be connected to a separate air source. The separate air source may be connected to the interior of the station utilizing, for example, ducting or other pneumatic connections. When drawing/exhausting air through the interior of the station, which may be isolated from the carriage, the air may be pass-through a filter or other sanitizing device.

In a further arrangement, the utilities include a communications device that allows for reading machine-readable identification information/indicia located on or within the pneumatic carriers received by the station and/or held by the carrier docks. In such an arrangement, the communications device may incorporate RFID, bar code or other automatic identification and data capture (AIDC) systems. Such other AIDC systems may include, without limitation, magnetic stripes and/or optical character recognition (OCR). In any arrangement, the communications device is operative to identify identification information for the carrier and/or the contents within a carrier. Such identification information is typically provided to a controller, which may be incorporated into the station or be remote from the station (e.g., pneumatic tube system controller). Such controllers may utilize the information from the carrier and/or carrier contents to control the operation of the station and/or the pneumatic tube system.

The ability to obtain identification information/indicia associated with the carriers and/or their contents allows for various control functionality. For instance, such identification information may be correlated with a stored transaction record for the carrier and or its contents. That is, the identification information may be utilized access a transaction record within a database associated with the carrier and/or its contents. Alternatively, such a transaction record may be included in the identification information as read from the carrier and/or its contents. In one arrangement, the identification information and/or transaction record may require a user to provide authorized credentials prior to allowing access to a carrier within the station. In such an arrangement, upon receiving a carrier, the station may identify the carrier as a 'secured carrier' and move/rotate the carrier dock holding the carrier to a non-accessible location (i.e., a location away from the access opening) and/or close an access door covering the access opening. Upon receiving an authorized user input (e.g., from a user interface, which may be incorporated into the station) the station identifies the carrier dock including the carrier associated with the user input and rotates the carrier dock to the access opening and/or opens the access door to permit access to the secured carrier. While holding a carrier awaiting an authorized user input, the utilities may process additional carriers (e.g., outgoing or incoming) while preventing access to the carrier.

In another control functionality, users may insert one or more carriers into the carrier docks of the station in conjunction with provision of delivery information for each carrier. Once a carrier and its destination information are received and/or stored, the carrier dock holding the carrier may be rotated to non-accessible position for subsequent delivery. That is, rather than immediately delivering the carrier to the pneumatic tube, the carrier may be securely maintained within the carrier station for subsequent delivery.

DETAILED DESCRIPTION

Reference will now be made to the accompanying drawings, which at least assist in illustrating the various pertinent features of the presented inventions. In this regard, the following description is presented for purposes of illustration and description. Furthermore, the description is not intended to limit the disclosed embodiments of the inventions to the forms disclosed herein. Consequently, variations and modifications commensurate with the following teachings, and skill and knowledge of the relevant art, are within the scope of the presented inventions.

Figure 1:
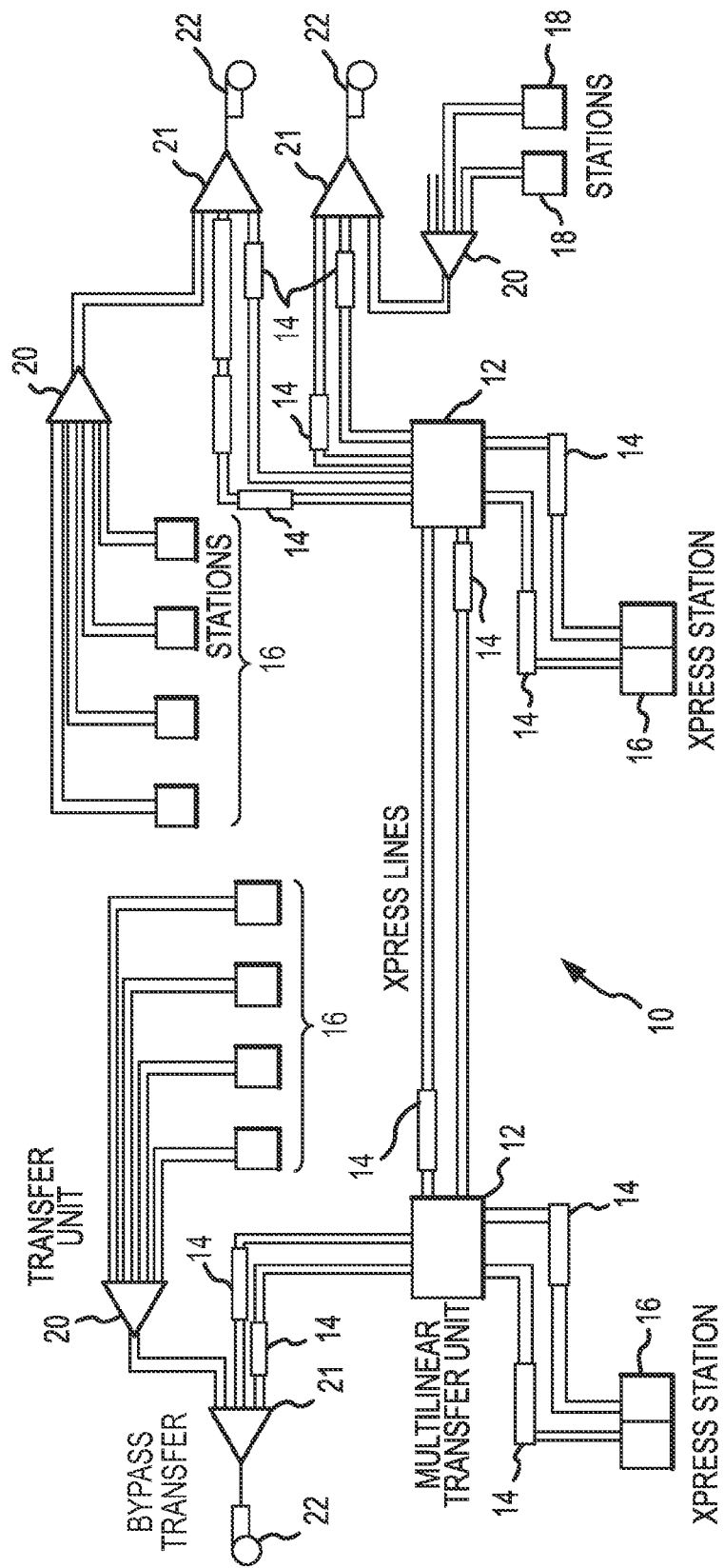
FIG. 1 illustrates an exemplary pneumatic transport system.

FIG. 1 illustrates an exemplary pneumatic transport system. In general, the pneumatic transport system 10 transports pneumatic carriers between various user stations 16, 18, each such transport operation being referred to as a "transaction". At each of the user stations 16, 18, a user may insert a carrier, select/enter a destination address/identification and a transaction priority, and then send the carrier. The system determines an optimum path to route the carrier and begins directing the carrier through the system.

Interconnected with each station 16, 18 of the exemplary system 10 is a transfer unit 20 which orders carriers arriving through different tubes from a different station 16, 18 into a single pneumatic tube. This pneumatic tube is further in connection with a vacuum by-pass transfer unit 21 (i.e., a turnaround transfer unit) and a blower 22 that provides the driving pneumatic force for carrier movement. The pressure/vacuum from the blower is operative to create a pressure differential across a carrier disposed within the pneumatic tubes and causes the carrier to move through the pneumatic tubes. That is, the blower 22, transfer units and pneumatic tubes create a pneumatic zone or circuit for use in transporting carriers between first and second points within the system 10. Multiple different zones connected using transfer units 12 collectively define the pneumatic transport system 10. Within the system 10, one or more devices are employable for ordering and routing carriers to their selected destinations. One type of device is a traffic control unit (TCU) 14, which is employable to receive, temporarily store and release a number of carriers. Also included in the system 10 are multi-linear transfer units (MTUs) 12 which have functionality to direct carriers from one pneumatic tube to another pneumatic tube (e.g., between tubes in single zone or between different zones).

Figure 2:
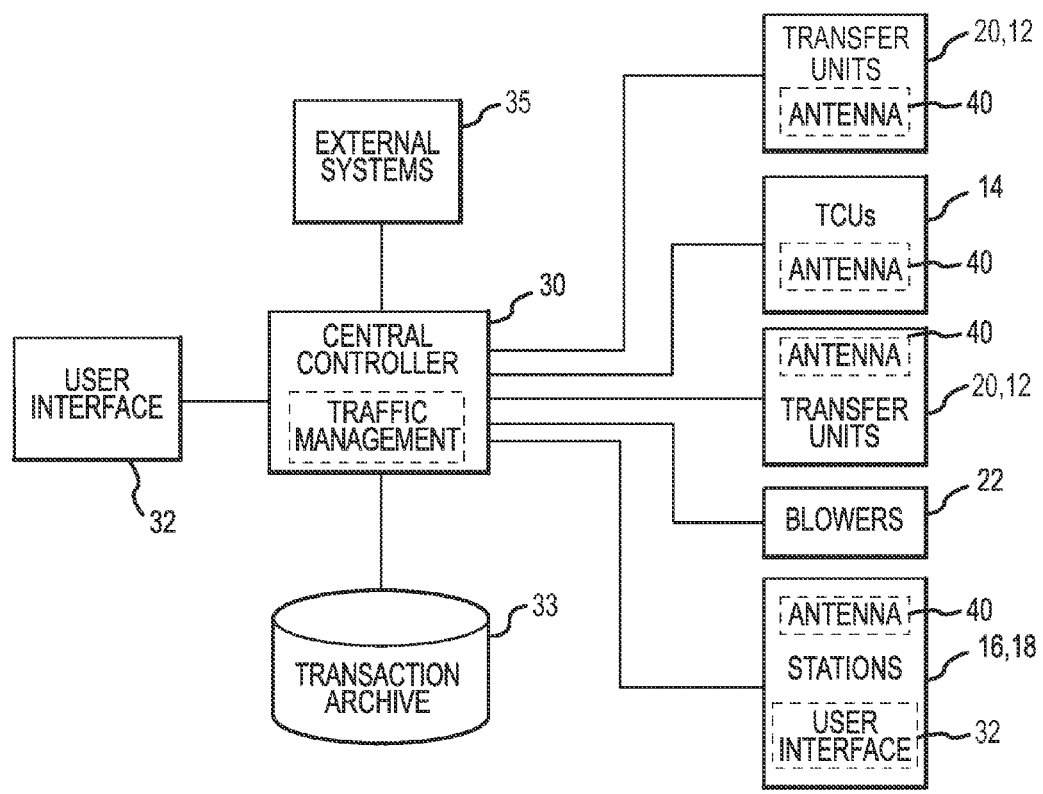
FIG. 2 illustrates an exemplary control system for a pneumatic transport system.

All of the components described in FIG. 1 are electronically connected to a system central controller (SCC) 30 that controls their operation and which is disclosed in the electrical system diagram of FIG. 2. The system central controller (SCC) 30 provides centralized control for the entire pneumatic carrier system 10 and may include a digital processor and memory/achieve 33. Connectable to the SCC 30 may be one or more user interfaces 32 through which a system user may monitor the operations of the system and/or manually enter one or more commands to control its operation. In addition to controlling the operation of the carrier system 10 as depicted in FIG. 1, the SCC 30 may provide additional functionality. Such functionality may include, without limitation, interconnection to external systems 35 and/or use of identification devices/antenna readers 40 that may allow for identification of carriers within the system 10. Such readers or communication devices may permit reading identification elements such as bar codes or RFID elements attached to carriers or their contents. A system for RFID identification within a pneumatic carrier system is described in U.S. Pat. No. 7,243,002, entitled, "System and Method for Carrier Identification in a Pneumatic Carrier System," having an issue date of Jul. 10, 2007, the contents of which are incorporated by reference herein.

Figure 3:
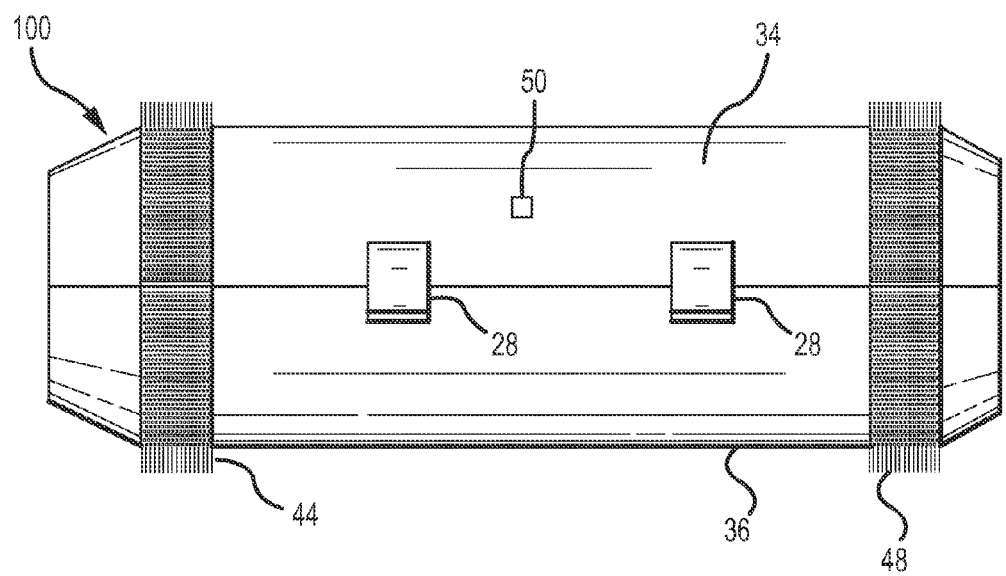
FIG. 3 illustrates a carrier for use in a pneumatic transport system.

FIG. 3 illustrates one non-limiting type of carrier 100 for use with a pneumatic system. Generally, the carrier 100 is positionable between an open position for loading cargo on a closed position for transport. The carrier 100 includes a first shell member 34 and a second shell member 36 (e.g., clamshells) that collectively define an enclosed space (not shown) for use in carrying the cargo through the system 10. The first and second shell members 34, 36 are generally adjoinably cylindrical in cross-section for use in correspondingly cylindrical pneumatic tubes (not shown) of the system 10. At least one hinge member pivotally interconnects the first and second shell members 34, 36 for movement between the open and closed configurations. Further, at least one latch 28 allows for securing the first and second shell members 34, 36 in the closed configuration.

Included as part of the carrier 100 are a first wear band 44 and a second wear band 48 that are sized to fit snuggly within the inside surface of the pneumatic tubes of the system 10. By substantially blocking the passage of air across the carrier 100, the first and second wear bands 44, 48 create a pressure differential across the carrier 100 that pushes or draws the carrier 100 through the pneumatic tubes of the system 10. Though a side-opening carrier is described, it will be appreciated that differently configured carriers (e.g., end-opening) may be utilized. Also attached to the carrier 100 is an identification element 50. The identification element 50 may be an RFID chip, a bar code or other machine readable element. In use, the identification devices/antenna readers 40 are operative to read the identification element to identify information about the carrier. For instance, the SCC 30 may correlate and identifier/indicia from the identification element with a stored transaction record. Such a transaction record may indicate, for example, that the carrier contains restricted contents and that the carrier is to remain secured within the system prior to receipt of specific access information (e.g., PINs, access cards etc.). Alternatively, in the case of RFID elements, such RFID elements may be disposed within the carrier (e.g., attached to carrier contents).

Figure 4B:
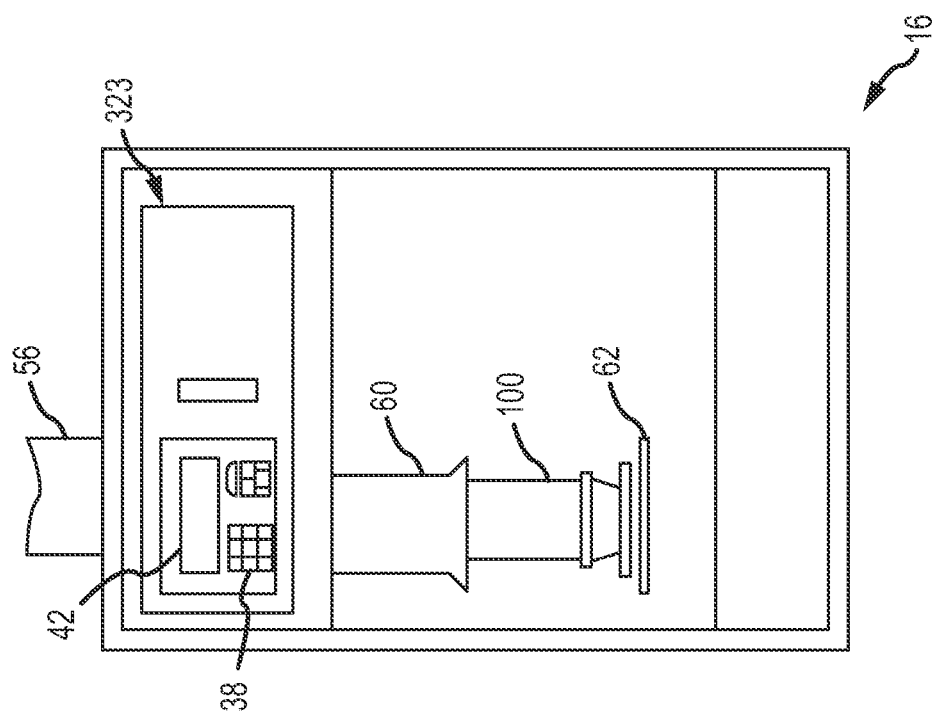
FIGS. 4A and 4B illustrate a prior art pneumatic transport system station.
Figure 4A:
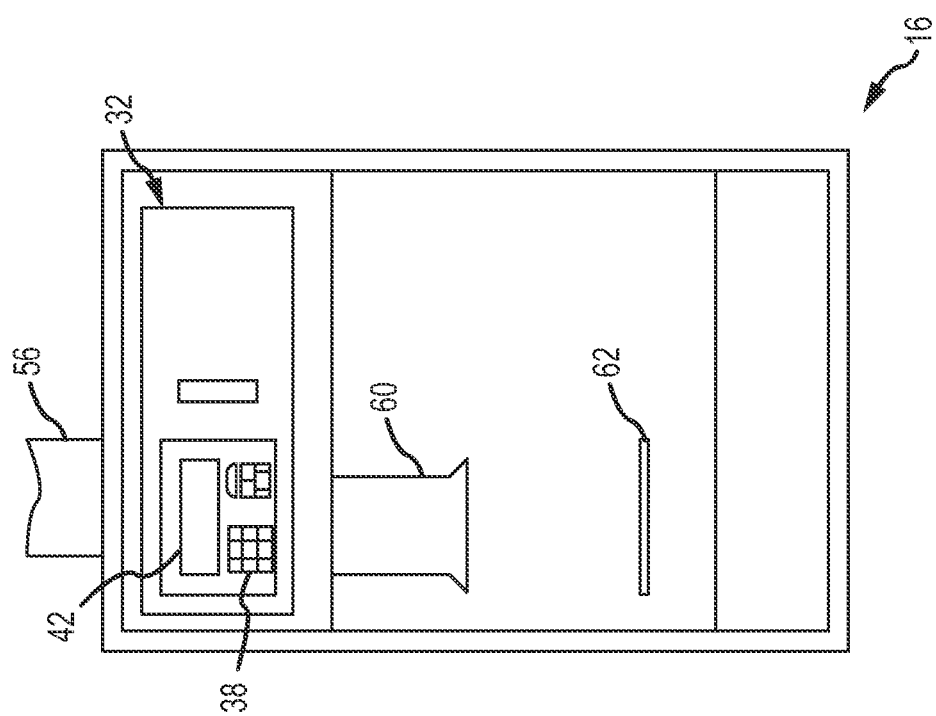

FIGS. 4A and 4B are front views of a prior art station 16 which is employable in the pneumatic carrier system 10 described herein. As shown, the station 16 includes a dispatcher connected to a pneumatic tube 56 that is employable for transporting and delivering carriers 100 to and from the station 16. Also included with the station 16 is a user interface 32 that includes a control panel 38 that has a number of interactive devices which a system user may employ for entering data including. The user interface 32 includes a display 42 which is configured to present messages relating to transaction and system status which are viewable by a system user.

A dispatcher 60 of the station is sized to receive an end of a carrier placed in the station. Positioned relative to the dispatcher 60 is a carrier holder 62 that is configured to allow a system user to place a carrier on the holder 62 and enter destination information through the control panel 32. Once all the appropriate information has been entered, the dispatcher 60 will move the carrier 100 into a pneumatic tube 56 for transport to a selected destination. Likewise, when a carrier 100 is received by the station 16, the carrier descends into the station, typically under the force of gravity, through the dispatcher 60 until it is stopped by the holder 62. In this arrangement, a user must physically remove the carrier from the holder 62 before the station can receive an additional carrier or send a carrier.

The healthcare industry often utilizes pneumatic tube transport systems to move patient samples and drugs from a centralized dispensing or collection point to the point of analysis or use. For example, a central pharmacy may receive a doctor's orders and dispense medications for distribution to a plurality of stations via pneumatic tube and then to the patients themselves via nurses positioned near the stations. In such systems, stations often encounter significant traffic. Accordingly, the requirement that a user remove each carrier from the station before the station receives another carrier results in lowered throughput for the station. That is, the ability to receive a single carrier creates a system bottleneck.

To alleviate the bottleneck created by requiring physical removal of a carrier from a station, some systems incorporate a station having a receiving bin. Rather than descending to a holder, which stops movement of the carrier, a carrier drops directly into the receiving bin. While effective in allowing delivery of multiple carriers free of user intervention, such stations have a number of drawbacks. Specifically, payloads of some transactions are subject to pilfering. For example, monetary transactions and pharmaceutical/drug delivery transactions may be subject to unauthorized removal after delivery to a destination station. Additionally, transactions may contain confidential or privileged information the receipt of which should be limited to authorized recipients.

Pneumatic tube system manufacturers have responded to the pilfering issue by providing several methods for improving delivery side security (e.g., access control methods). The first and simplest is the installation of a physical security and barriers at the stations themselves. Such systems usually include a door or barrier between the delivered carriers and recipients. The door may be transparent or opaque and may include a lock. These devices are designed to provide a modest level of physical security by assuring only authorized personnel have access to the delivered carriers. Other systems require entry of a personal identification number (PIN) or use card readers to confirm that a recipient is authorized to retrieve the 'secured carrier'. Such system allow access to a carrier held by the station only after appropriate ID is received. While effective, the station is often out of use until the appropriate recipient retrieves their carrier.

To alleviate these and other concerns, the present invention is directed to a pneumatic tube station having a plurality of receiving/dispatching docks that allows for receiving and securely holding one or more carriers and/or staging one-or more carriers for dispatch. That is, the station is available for dispatching outgoing carriers while securely holding one or more carriers received by the station. Generally, the station 16 includes a carousel or carriage 110 having a plurality of carrier docks 112 disposed within a station housing 104. The housing 104 includes an access opening 118 and/or door 120 that limits access to a single carrier dock of the carriage. See FIGS. 5A-5C. When a single carrier dock is aligned with the access opening 118, a carrier may be loaded into or removed from the aligned carrier dock while other docks in the carriage remain inaccessible. In this regard, secured carrier (s) held by the station while awaiting authorized retrieval (e.g., PIN entry, etc.) may be maintained in a dock(s) rotated away from the access opening 118. This prevents the removal of a secured carrier from the station 16 while permitting continued use of the station 16. Further, the station allows for staging multiple carriers that may be launched in to the PTS during multiple blower cycles, a common blower cycle and/or upon a predetermined time schedule.

Figure 5A:
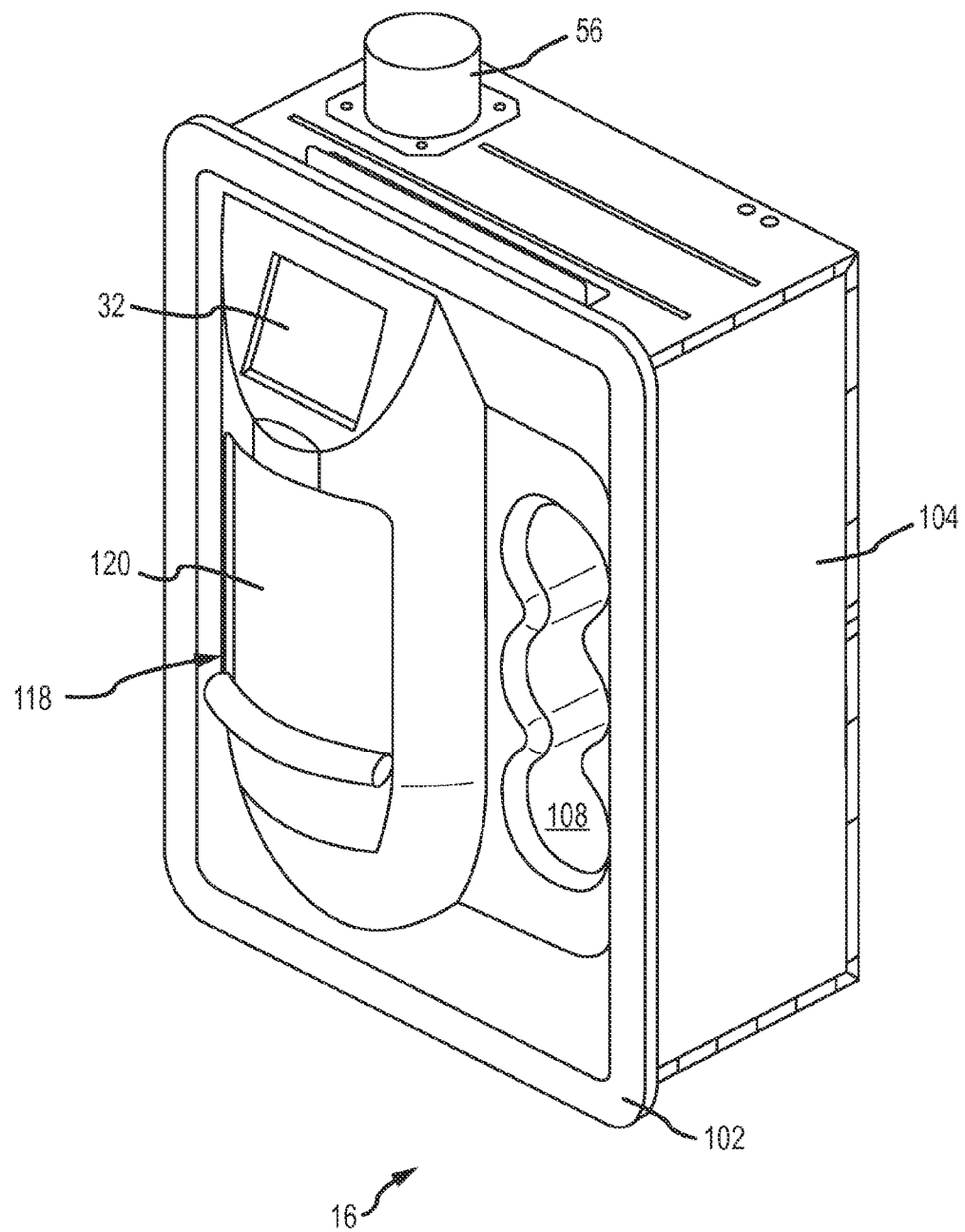
FIGS. 5A, 5B and 5C illustrate front perspective, rear perspective and front exploded perspective views of a multi-dock carrier station.
Figure 5B:
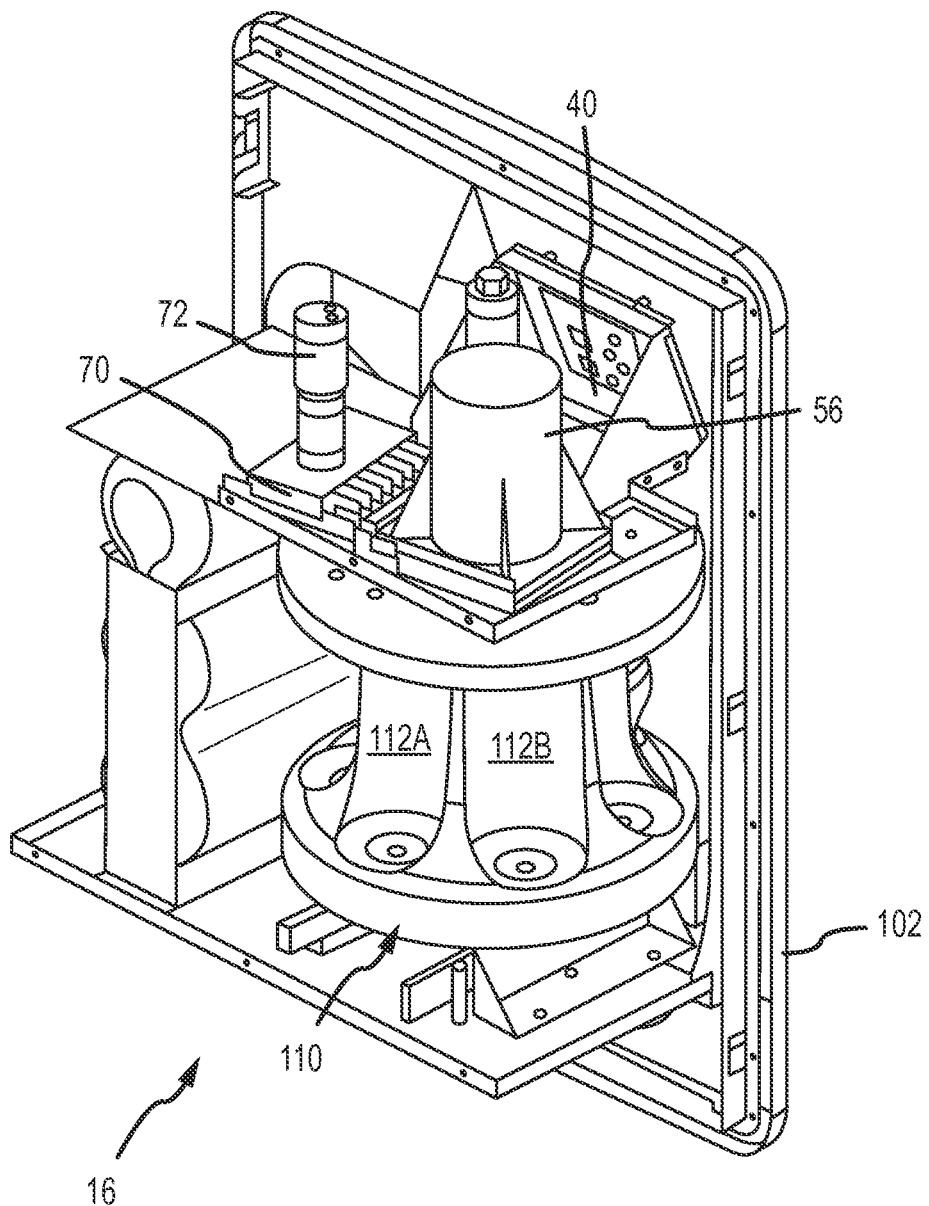
Figure 5C:
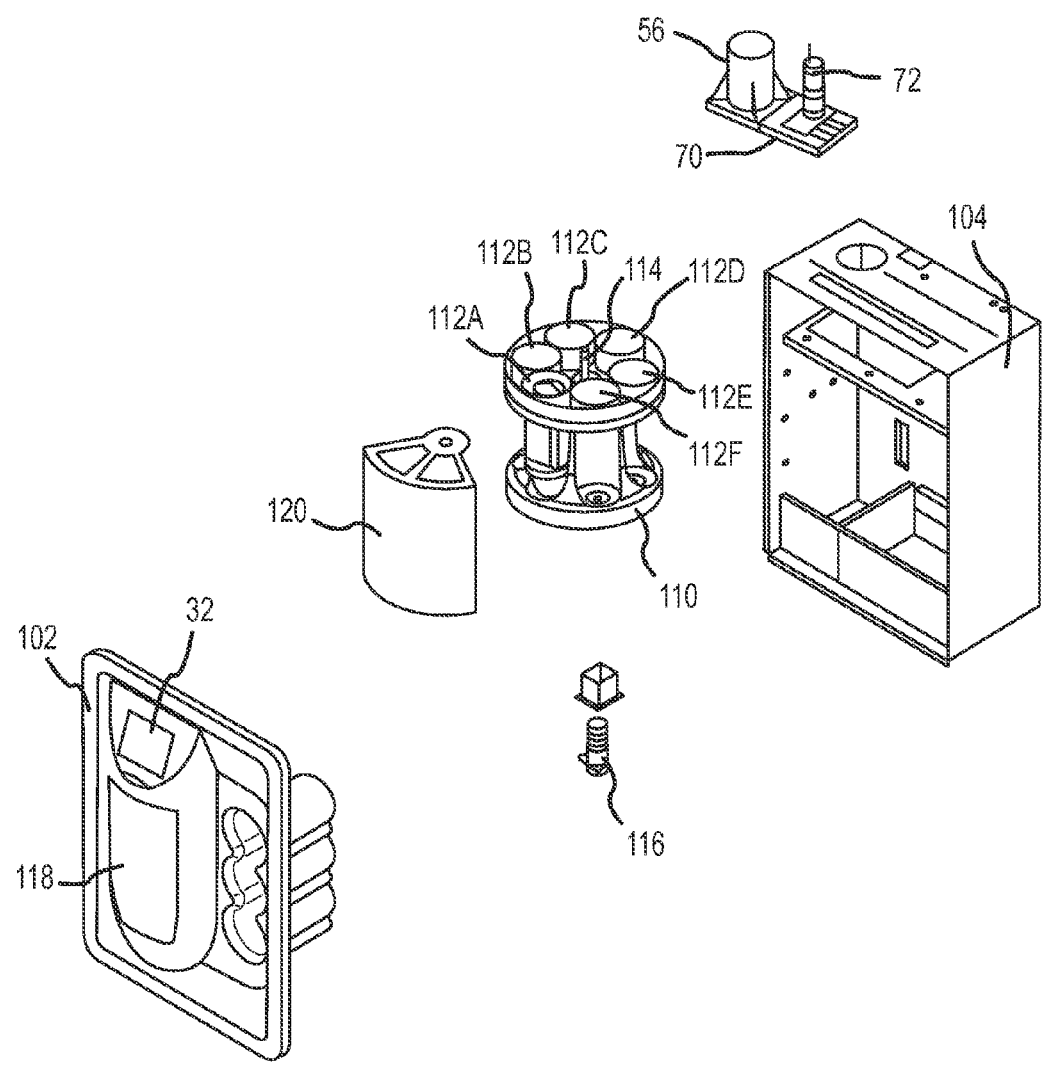

FIGS. 5A, 5B and 5C illustrate a front prospective view, a rear prospective view and a front exploded prospective view, respectively, of one embodiment of the multi-dock carrier station 16. As with prior stations, the station 16 is connectable to a pneumatic tube system via a pneumatic tube/port 56, through which pneumatic carriers enter and exit the station 16 via a single pneumatic tube. Likewise, the carrier station 16 includes a user interface 32 that allows users to enter destination information for sending carries and/or security information for receiving carriers from the pneumatic tube system. The user interface 32 is disposed on a front panel 102 of the station housing 104, which provides an internal enclosure housing active components of the station. In the present embodiment, the user interface 32 is a touch screen, however this is not a requirement. An access opening 118 is provided in the front panel 102 through which users are able to load carriers into the station and remove carries from the station. The illustrated station 16 also includes an antenna/readers 40 for reading identifying elements/devices attached to carriers and/or carrier contents.

As noted, the carousel or carriage 110 having a plurality of carrier docks 112A-112F (hereafter 112 unless specifically referenced) is disposed within the housing 104. The plurality of carrier docks 112 enable to the station to receive and hold one or more carriers, while still permitting the station to be used to dispatch one or more carriers. The carriage 110, in the present embodiment, includes six carrier docks 112A-112F, though other embodiments may utilize more or fewer docks. The carriage 110 is rotatively supported about a central axel/axis 114. An actuator or motor 116 is used to control the rotation of the carriage 110 within the housing 104. More specifically, the actuator may controllably rotate the carriage 110 to align any one of the multiple carrier docks 112 with the pneumatic port 56 of the carrier station 16. In this regard, any of the multiple carrier docks 112 may be aligned to receive/dispatch a carrier from/to the pneumatic tube system. In the present embodiment, the pneumatic port 56 is in a rearward portion of the housing 104. That is, a carrier received by a carrier dock of the carriage 110 from the pneumatic port 56 is not initially aligned with the access opening 118 on the front panel of the station 16. Once a carrier is received by the carrier dock 112 of the carriage 110, the carriage must be rotated by the actuator 116 to align the dock holding the received carrier with the access opening 118 in the front panel 102 of the station. Likewise, a carrier loaded into a carrier dock through the access opening in the front panel must be rotated into alignment with the pneumatic port 56 prior to dispatch into the pneumatic tube system.

In the present embodiment, the access opening 118 is sized to limit access to a single carrier dock 112 of the carriage 110. That is, the access opening has a width that limits access to a single carrier dock 112 of the carriage 110. This prevents a user from accessing adjacent carrier docks. Further, the carriage may be locked to prevent further rotation once in a desired/authorized position.

To further improve security and prevent potential pinch points, during operation, the presented embodiment utilizes and an access door/panel that covers the access opening 118 when the carriage is in motion. In the present embodiment, the access door 120 is an arcuate panel member having a length that extends from top edge to a bottom edge of the access opening 118. In a closed position, the access door rotates into a position to cover the access opening. To provide such rotation, the access door may be rotatively coupled about the axis 114 of the carriage 110 and may be operated by an actuator or motor (not shown). Though utilizing a rotating access door, it will be appreciated that other access door configurations are possible (e.g., linear slide, swinging etc.) and considered within the scope of the presented inventions.

Figure 6A:
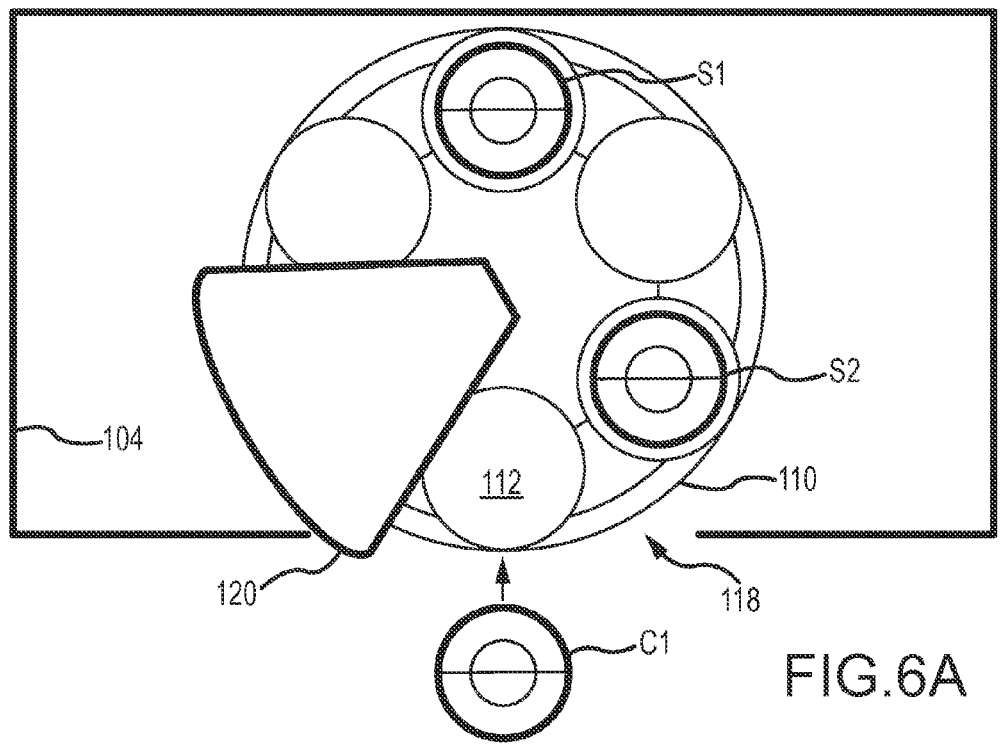
FIGS. 6A and 6B illustrate exemplary top views of a multi-dock carrier station.
Figure 6B:
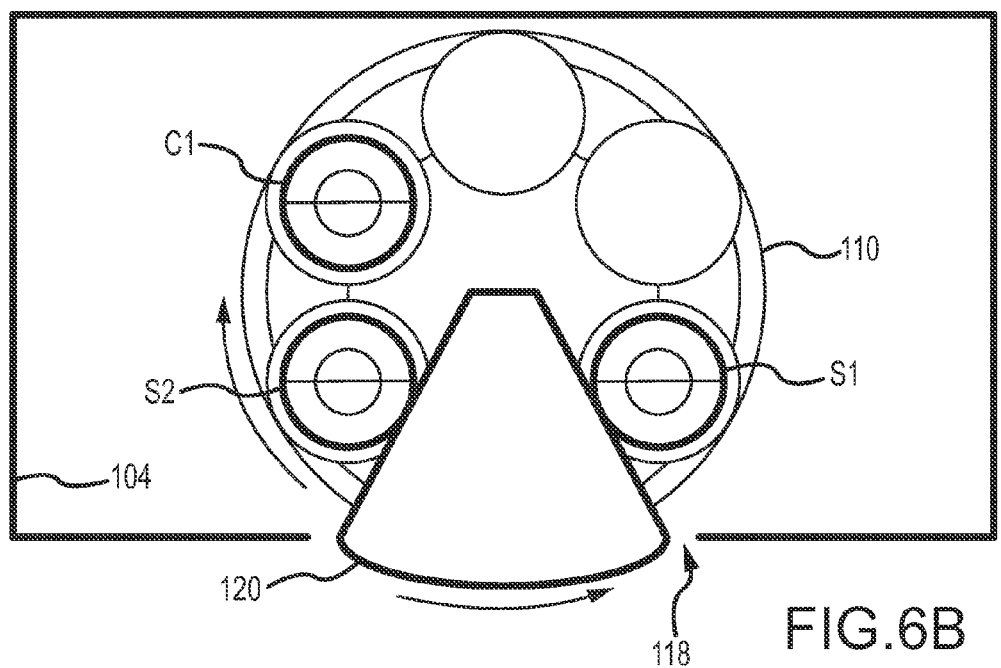
Figure 6C:
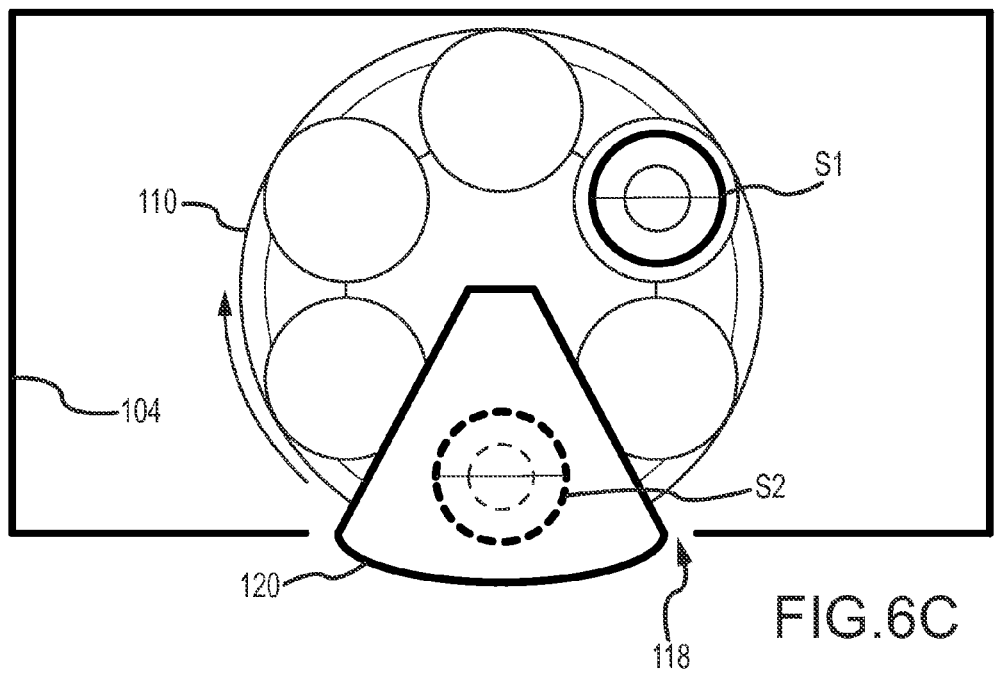
FIGS. 6C and 6D illustrate exemplary top views of a multi-dock carrier station.
Figure 6D:
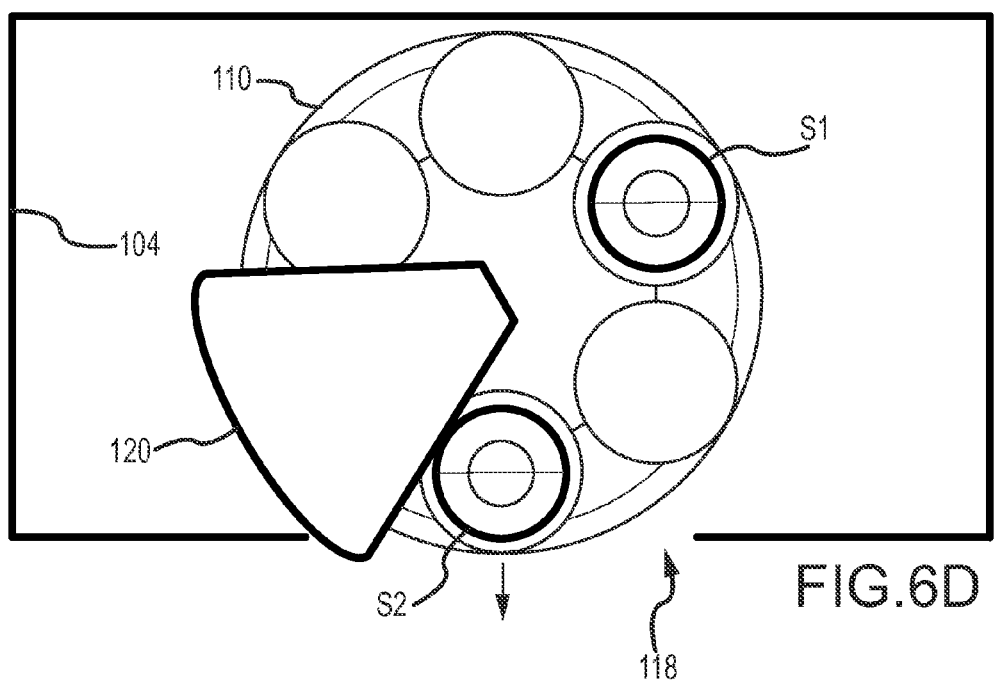
Figure 6E:
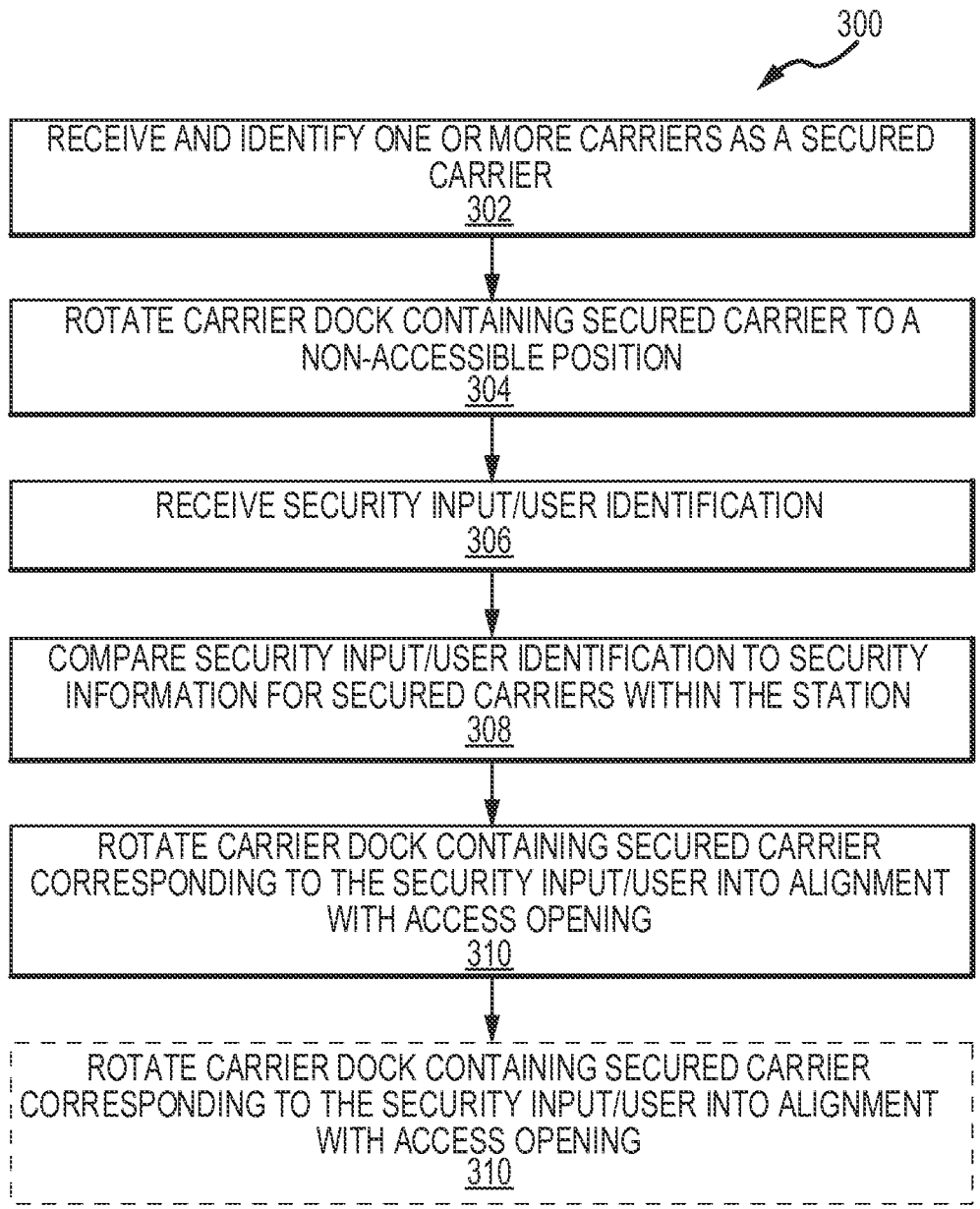
FIG. 6E illustrates an exemplary process.

As shown in FIG. 6A, the access door 120 is operative to rotate to an open position such that the access opening 118 is exposed allowing a user to access an aligned carrier port 112 of the carriage 110. As shown in FIG. 6B, the access door 120 is further operative to rotate to a closed position such that the access opening is covered. In the regard, the access door 120 may be closed prior to rotating the carriage 110 within the housing to prevent any potential pinch points for users as well as to prevent access to any carrier docks that rotate by the access opening. Further, if every dock within the carriage 110 were holding a secured carrier, the access door would be closed while the station awaited authorized recipients.

Figure 7:
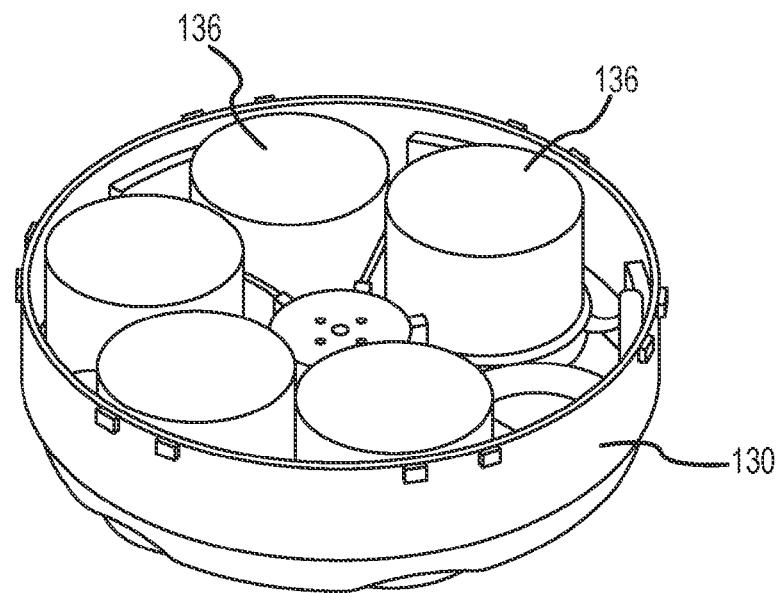
FIG. 7 illustrates multi-dock carriage.
Figure 7:
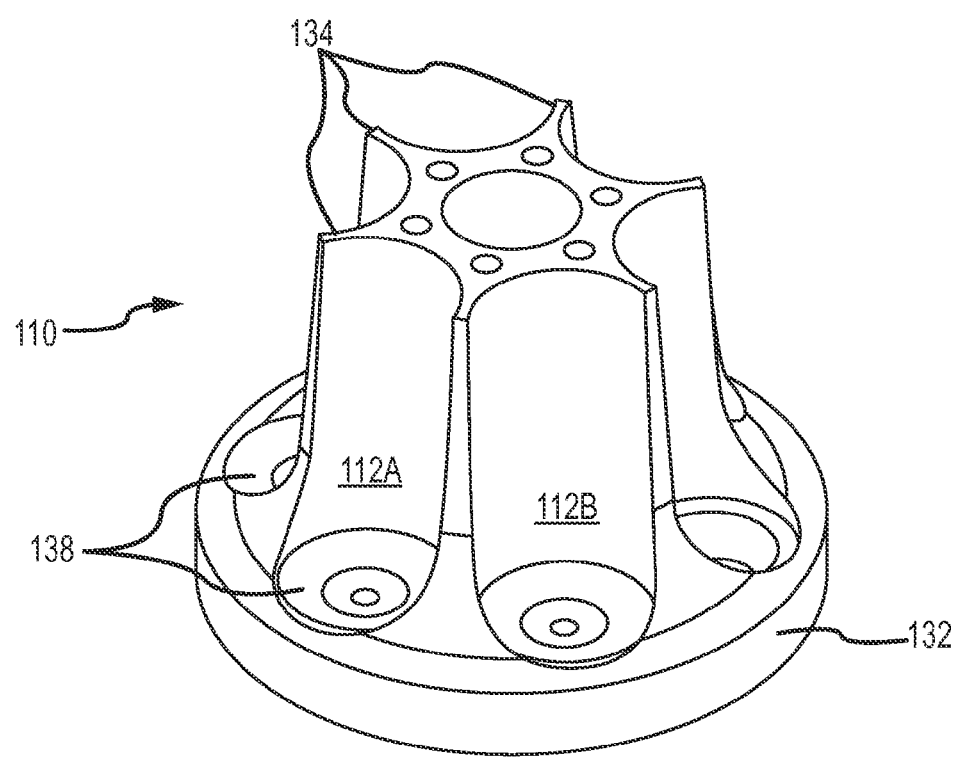

FIG. 7 illustrates an exploded perspective view of the multi-dock carriage 110. In the present embodiment, the carriage 110 includes an upper rim 130 having six openings or apertures 136, which define the upper ends of the carrier docks 112. A lower rim 132 includes six recesses 138 that are aligned with the upper rim openings and which defining the lower ends of the carrier docks 112. The rearward portion of each carrier dock 112 (i.e., the portion disposed proximate to the rotational axis of the carriage) forms an arcuate sidewall that extends between the upper and lower rims 130, 132. In contrast, the forward portions of the carrier docks are substantially open between the upper and lower rims 130, 132. That is, the radially outward portion of the carrier docks are open between the upper and lower rims 130, 132 such that carriers may be disposed into and out of the open sidewall portion of the carrier docks. Typically, the distance between the upper and lower rims 130, 132 is less than the length of a carrier. In this regard, a top of a carrier is disposed within the opening in the upper rim 130 while a bottom of the carrier is disposed in the recess in the second rim 132. This maintains a carrier in place until it is dispatched into the pneumatic tube system (e.g., via vacuum) or the carrier is removed through the open sidewall. In the latter regard, a user may lift the carrier's bottom end out of the recess (i.e., advance the top end further into the upper rim opening), angle the body of the carrier and withdraw the carrier out of the carrier dock. Loading may be performed in an opposite manner.

To further reduce the ability of users to access adjacent carriers held by the carriage, a divider/dividing wall 134 extends between each pair of the adjacent carrier docks (e.g., docks 112A and 112B). In the illustrated embodiment, arcuate back surfaces of adjacent carrier docks form the dividing wall 134 between the docks. That is, the dividers are integrally formed with the carrier docks. However, this is not a requirement and other embodiments may utilize separately formed dividers including flexible dividers. In any embodiment, when a first dock is aligned with the access opening, the dividing wall 134 prevents access to an adjacent dock. Stated otherwise, until a specific carrier dock is aligned with the access opening 118, removal of a carrier from such a non-aligned carrier dock is prevented.

One of the primary functions of the multi-dock station 16 is the ability to receive carriers while one or more additional carriers are securely maintained within in the station itself. That is, one or more 'secured carriers' may be maintained within the station awaiting an authorized recipient. In this regard, an authorized recipient may have to enter, into the user interface 32, a PIN, swipe an access card, biometric identification, etc. (e.g., user identification/verified information) prior to accessing a carrier delivered to their attention. Upon receiving verified authorization, the station is operative to close the access door 120 rotate the secured carrier into alignment with the access opening 118 and open the access door 120. At this time, the authorized recipient may remove the secured carrier from the carrier station. More importantly, the station allows for continued use while maintaining one or more secured carriers therein.

Referring to FIG. 6A, an exemplary embodiment is shown where the carriage 110 has received first and second secured carriers awaiting authorized access. Until authorization is received, the secured carriers S1 and S2 are maintained in user inaccessible positions. Though the two secured carriers S1, S2 are maintained within two of the carrier docks, other carrier docks remains available for use in dispatching and receiving carriers. As shown in FIG. 6A, the carriage 110 may rotate an open carrier dock into alignment with the access opening and open the access door 120 to receive a carrier C1 for dispatch to the pneumatic tube system. Once destination information is obtained for the carrier C1, the access door closes and the carriage rotates until the carrier C1 is positioned beneath the pneumatic dispatch port. See FIG. 6B. At this time, the pneumatic tube system may draw the carrier out of the carriage and into the system. Likewise, it will be appreciated at the process of FIGS. 6A and 6B may be reversed. That is, an open carrier dock of the carriage may receive a carrier and, if the carrier is unsecured (e.g. requires no access code etc.), the carriage may rotate the received carrier into alignment with the access opening, where a user may remove the carrier.

FIGS. 6A and 6C-6E illustrate a process 300 for removing a secured carrier from the station. Initially, one or more carriers (e.g., 51 and S2) are received and identified 302 of requiring user identification/security information prior to their release. The secured carrier(s) rotated 304 into a non-accessible position. See FIG. 6A. Subsequently, user identification is received 306, for instance, via a user interface at the station holding the secured carriers. The user identification is compared 308 to stored information (e.g., transaction records) for the secured carriers. Upon confirming the user identification/security information matches security requirements of one of the secured carriers (e.g., user is confirmed as authorized), the carrier dock including the corresponding carrier (e.g., S2) is rotated into alignment with the access opening 118. See FIG. 6C. If an access door covers 120 the access opening 118, the access door 120 is moved to expose 312 the access opening 118 permitting the authorized recipient to access the secured carrier S2. See FIG. 6D.

As will be appreciated, the present embodiment of the carrier station allows for receiving and holding up to five secured carriers while still being able to dispatch and receive carriers. Furthermore, it will be appreciated that the station may be utilized to stage multiple carriers for delivery. That is, when the pneumatic tube system is not immediately available, users may stage multiple carriers (e.g., up to six) into the carrier station 16 in conjunction with entry of delivery information for each of the carriers. The delivery information (e.g., delivery destination) for each carrier and its location within the carriage (e.g., dock) is maintained by the system controller. When the pneumatic tube system becomes available, the staged carriers rotate into position and launch into the pneumatic tube system (e.g., sequentially) for delivery to their stored destinations.

The multi dock station 16 includes various other components. For instance, as shown in FIGS. 5B and 5C, the inlet port/tube 56 is connected to a slide plate assembly. That is, a slide plate 70 is provided that positions into and out of the pneumatic path of the carrier station. An actuator 72 is operative to move the slide plate 70 into and out of the pneumatic path. The slide plate reduces or prevents air flow through the port 56 to provide an air cushion that slows arriving carriers. Further, the slide plate allows maintaining carriers above the station for various pneumatic tube system functionality. Such functionality includes the ability to park a carrier above the station for traffic management purposes such as set forth in co-owned U.S. Pat. No. 8,721,231, the contents of which are incorporated here my reference. Alternatively, carrier identities may be confirmed prior to entering into the station. If the carrier has been misdirected and is at an incorrect location, the carrier may be returned to the system for further processing. The front panel 102 of the station 16 may also include carrier storage bins 108 where extra carriers may be stored prior to use.

Figure 8:
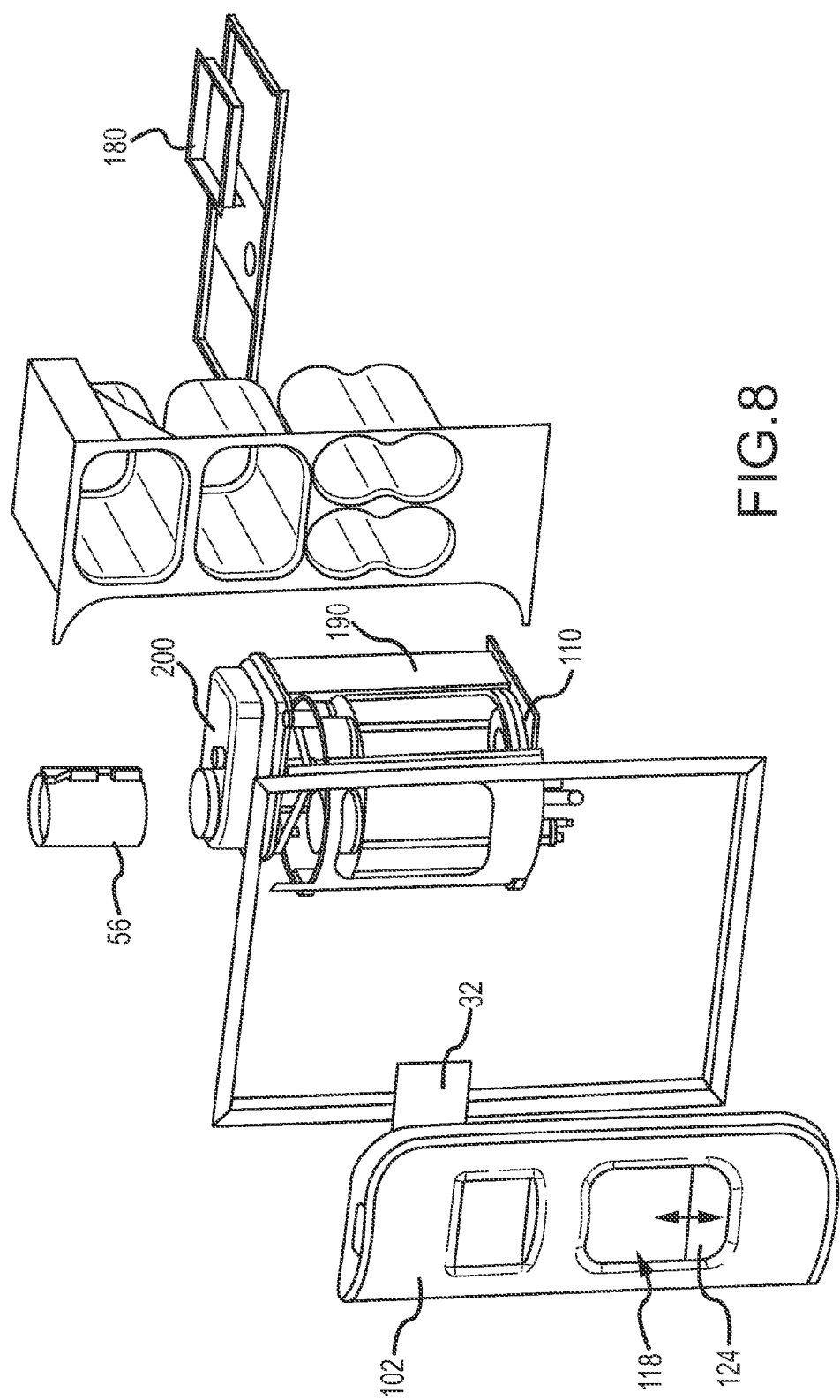
FIGS. 8 and 9 illustrate a further embodiment of a multi-dock carrier station.
Figure 9:
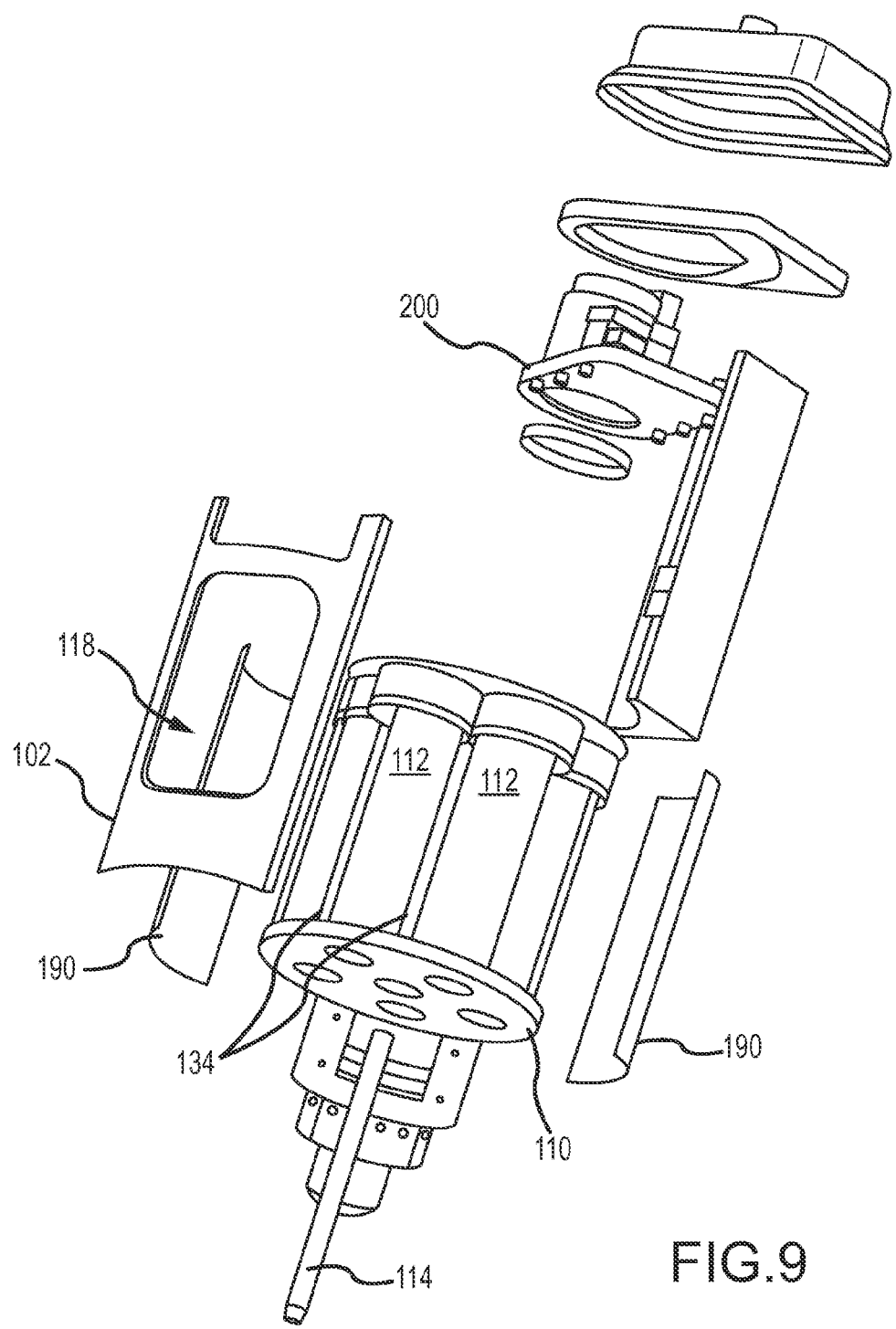

FIGS. 8 and 9 illustrate a further embodiment of a pneumatic tube station 16 having a plurality of receiving/dispatching docks. The station 16 of FIGS. 8 and 9 shares a number of features with the station illustrated in FIGS. 5A-5C. Common elements include the same reference numbers. However, the embodiment of FIGS. 8 and 9 has a number of differences. Among these differences is that this embodiment of the station 16 includes a sliding actuating door 124 rather than the arcuate panel 120 of FIGS. 5A-5C. The sliding actuating door 124 moves up and down relative to the access opening 118 of the front panel 102 of the station 216. However, rather than entirely closing the access opening 118, the sliding actuating door 124 only partially closes the access opening. That is, the vertical actuating door, in the closed position, reduces the size of the access opening 118 to a size that prevents insertion or removal of carriers from the carrier docks 112 but does not completely close the access opening 118. This feature eliminates a potential of a pinch point for the station 16. That is, having only partially closing door eliminates a potential of a user having a finger or hand closed within the door during operation. To further reduce the potential of a user being pinched when the carriage 110 turns, the carriage 110 may be driven using a rubber wheel which engages the upper or lower rim of the carriage. In such an arrangement, if an object becomes stuck between the carriage and the housing, the rubber wheel will slip. Such slippage occurs prior to significant force being applied to the object (e.g., hand or finger).

Another aspect of the station of FIGS. 8 and 9 is based upon the realization that the operation of the PTS not only transports pneumatic carriers and their contents between system locations (e.g., stations), but may also transfer air between various locations in a facility. That is, upon applying air pressure (e.g., vacuum) to a carrier at a first/origination station to move the carrier into the PTS, air from the location of the first station is drawn into the PTS until, for example, the carrier reaches a turn-around location where the carrier is stopped. Once the PTS is realigned to provide a pneumatic path toward the ultimate destination of the pneumatic carrier, air flow (e.g., positive air pressure) is provided to propel the pneumatic carrier from the turn-around location towards its ultimate destination. Not only is the carrier transported between the first station and the second station, a portion of air drawn into the PTS from the first station location may be expelled at the second station location via the PTS. In the case of airborne pathogens, a risk of cross-contamination exists. To reduce the potential for cross contamination, the station 216 of FIGS. 8 and 9 incorporates a filter 180 and diversion valve 200.

Figure 10A:
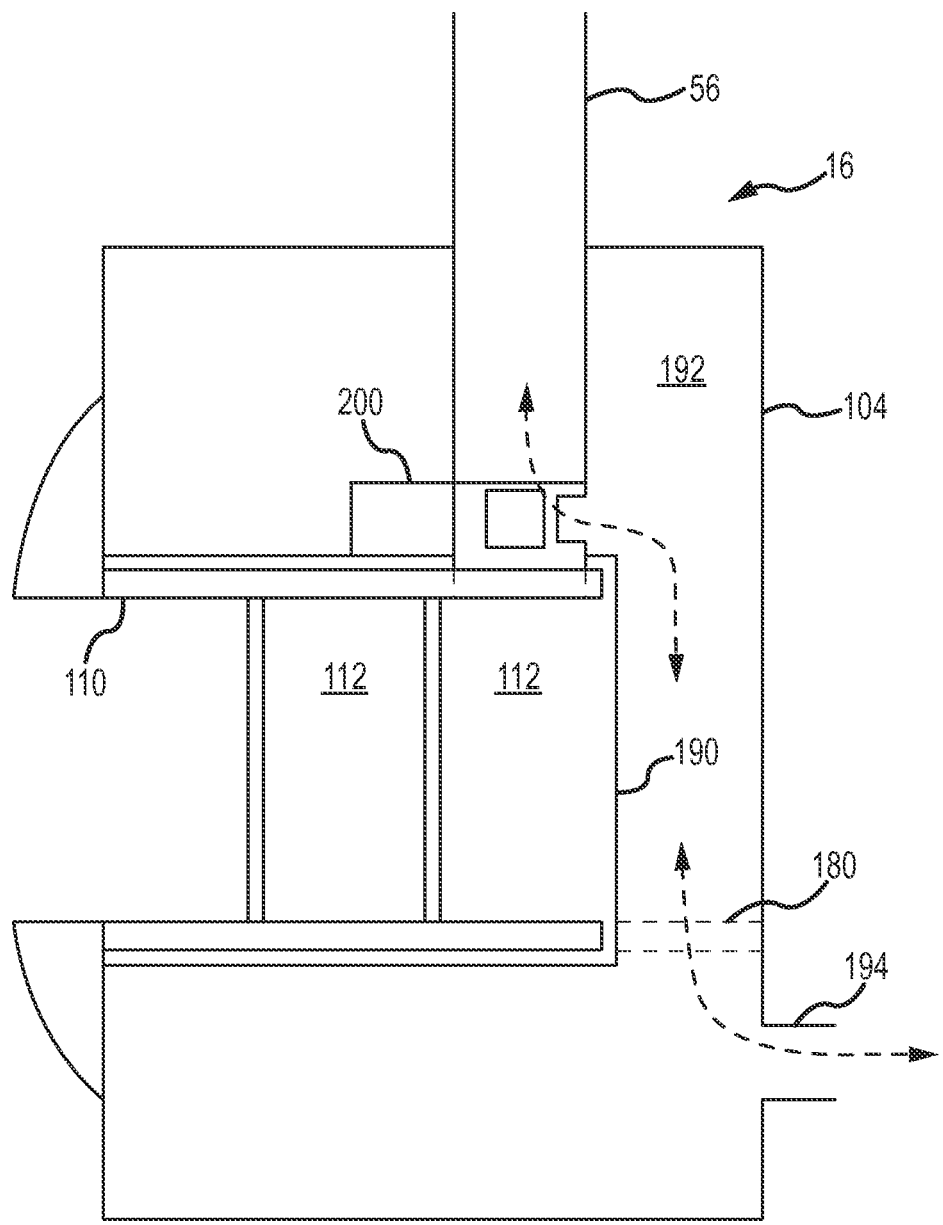
FIGS. 10A and 10B illustrate selectively diverting air through a multi-dock carrier station.

As variously shown in FIGS. 8, 9 and 10A (i.e., exemplary cross-sectional side view; not to scale), the carriage 110 is disposed within a housing 104 of the station 16. As best shown in FIGS. 8 and 9, air plenums/shields 190 surround the carriage 110, when it is disposed within the housing. In this regard, the carriage 110 is isolated from the remainder of the interior 192 of the housing. Further, the remainder of the interior 192 of the housing is fluidly connected to an external air source 194. Such an external air source may be an ambient air source or an air source that is isolated from the room where the station is located. In one arrangement, the remainder of the interior of the housing is fluidly connected to a space in the ceiling above the room housing the station. In any case, such a fluid connection requires that the airflow passing out of and/or into the interior of the housing pass through the filter 180.

Figure 10B:
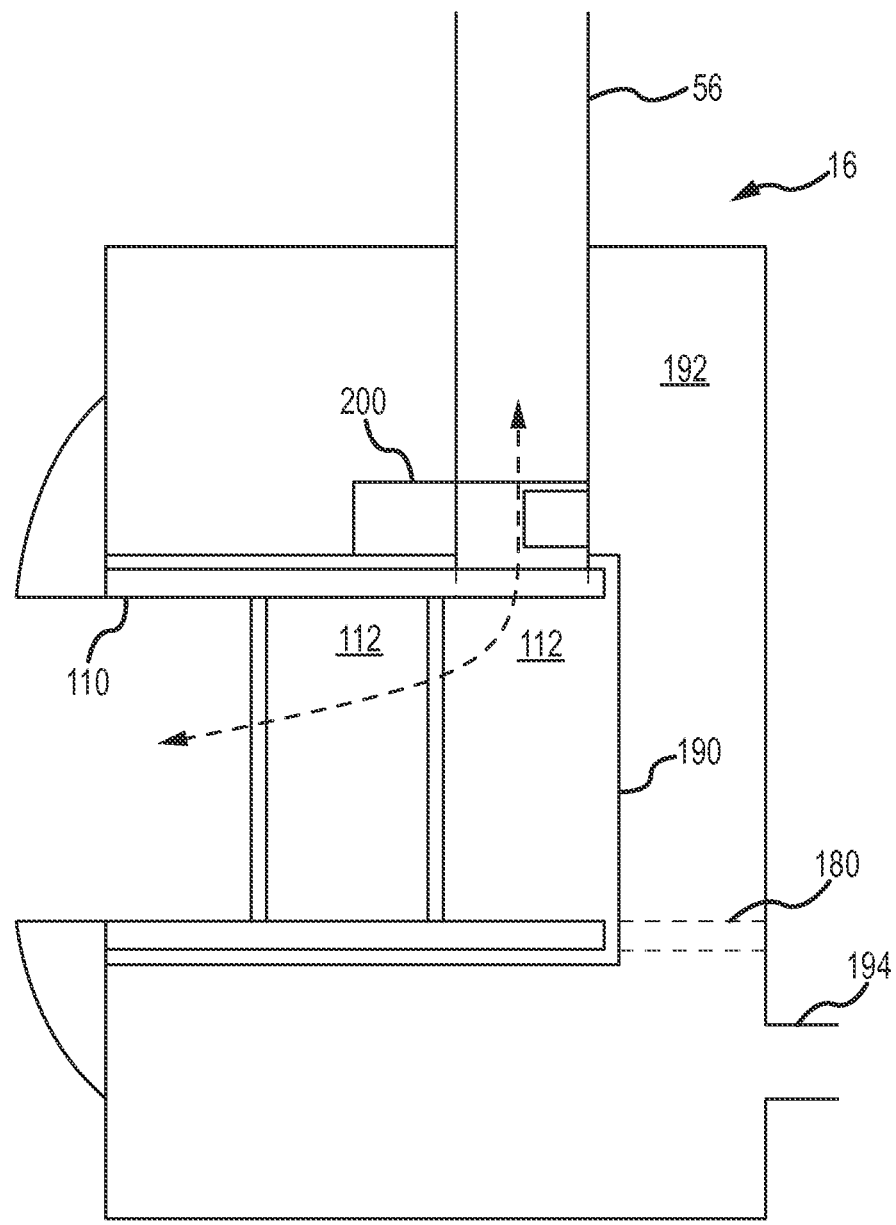

In operation, the valve 200 is opened and closed to selectively divert air to and from the interior 192 of the housing 104 and, hence, through the filter 180 during dispatch in receipt of a pneumatic carrier. By way of example, when a carrier is inbound for the station, the air valve 200 may be opened (see FIG. 10A) such that air passing through the pneumatic tube connecting to the station is vented into the interior 192 of the station 16 and not through the front surface of the station. In this regard, no air from the pneumatic tube system is displaced into the room housing the station. When the carrier arrives, the carrier passes through the valve and into the carriage 110. During dispatch, it may be necessary to apply vacuum to a carrier positioned in the dock 112 below the pneumatic tube 56. In such an arrangement, the valve 200 may be temporarily closed (see FIG. 10B) such that air is drawn into the carriage to allow the carrier to be displaced into the pneumatic tube system. A sensor may identify when the carrier enters the system and passes beyond the valve. Once the carrier has passed the valve 200, the valve may be reopened to draw air through the filter 180 and from the external air source. In such an arrangement, very limited amounts of air are displaced from the room housing the station into the pneumatic tube system or from the pneumatic tube system into the room housing the station.

Figure 11:
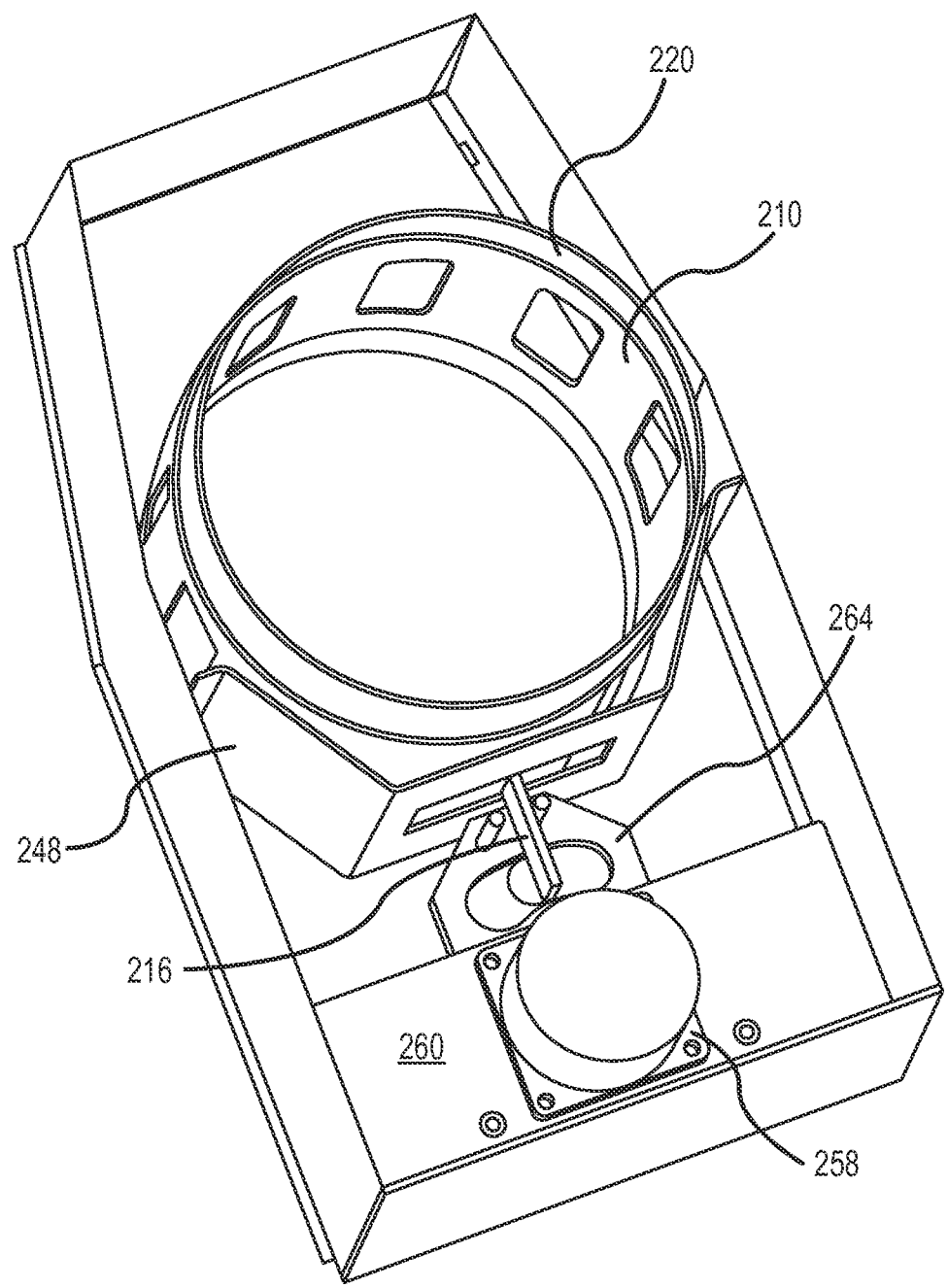
FIGS. 11, 12A and 12B illustrate a valve for use in diverting air through a station.
Figure 12A:
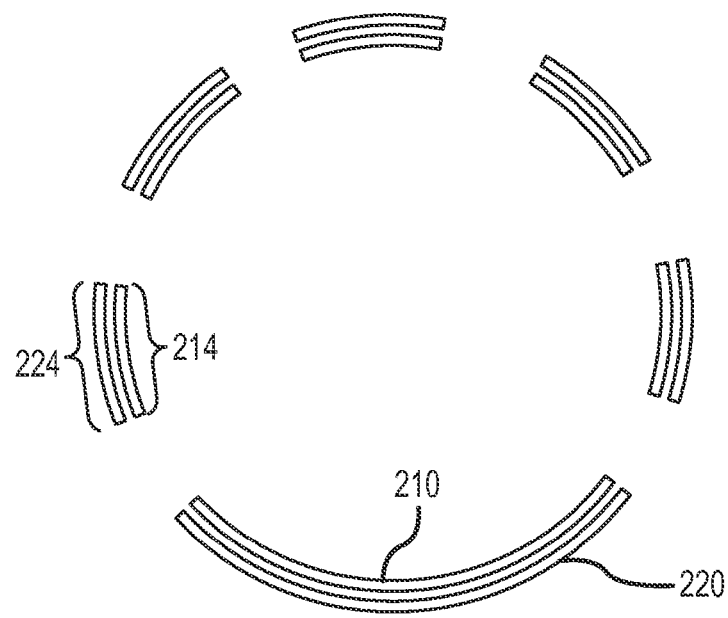
Figure 12B:
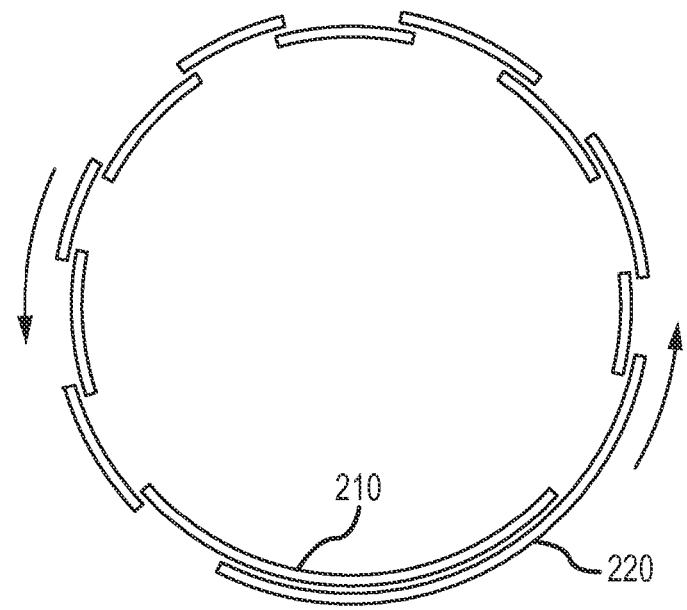

FIGS. 11-12B illustrate one exemplary embodiment of the valve. As shown, the illustrated embodiment of the valve is a rotary valve assembly having an outer sleeve 220 that rotates around the outside surface of an inner sleeve 210. The inner sleeve 210 is formed from a pneumatic tube section having a diameter that is the same as the diameter of the pneumatic transport tubes of the pneumatic tube system. In this regard, the internal bore of the inner sleeve 210 shares a common diameter with the pneumatic tubes of the system. That is, the internal diameter of the inner sleeve 210 is sized to permit the passage of a pneumatic carrier there through. The outer sleeve or rotary sleeve 220 has an inside diameter that is slightly greater than the outside diameter of the inner sleeve. As illustrated in FIG. 10, the outer sleeve 220 is disposed around the outside surface of the inner sleeve 210 when assembled.

The inner and outer sleeves each include a plurality of apertures or fluid flow ports 214 and 224, respectively. As shown, these ports 214, 224 extend through the sidewalls of the respective sleeve members 210, 220. The ports 214 in the inner sleeve 210 and the ports 224 in the outer sleeve 220 are aligned in a first configuration and misaligned in a second configuration. That is, the valve may be selectively opened and closed.

FIGS. 12A and 12B illustrate a cross-sectional view of the inner and outer sleeves 210, 220 in aligned and misaligned configurations, respectively. As shown in FIG. 12A, the inner sleeve 210 and its ports 214 are aligned with the ports 224 in the outer sleeve 220. In this regard, it will be appreciated that air passing through pneumatic tubes connected to the ends of the inner sleeve 210 may be exhausted through or drawn in through the aligned ports. When the ports are non-aligned (see FIG. 12B), solid sidewall sections (i.e., axial sidewall sections) between the ports 224 of the outer sleeve are disposed over the ports 214 of the inner sleeve 210. In this regard, airflow passing through the valve 200 may be prevented from exiting the valve and is directed through the internal bore of the internal valve. As shown, an actuator 258 and linkage assembly 216, 264 are utilized to rotate the outer sleeve 220.

Figure 13A:
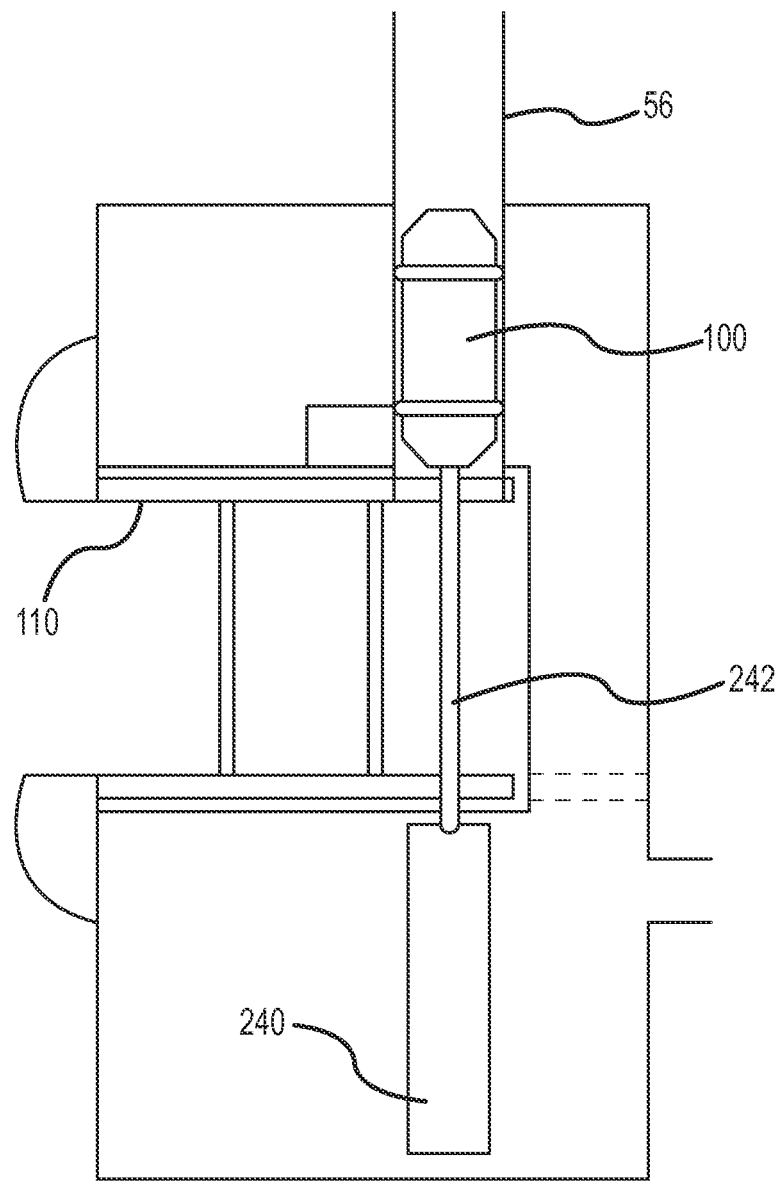
FIGS. 13A, 13B and 13C illustrate a linear actuator for use in receiving or launching a carrier.
Figure 13B:
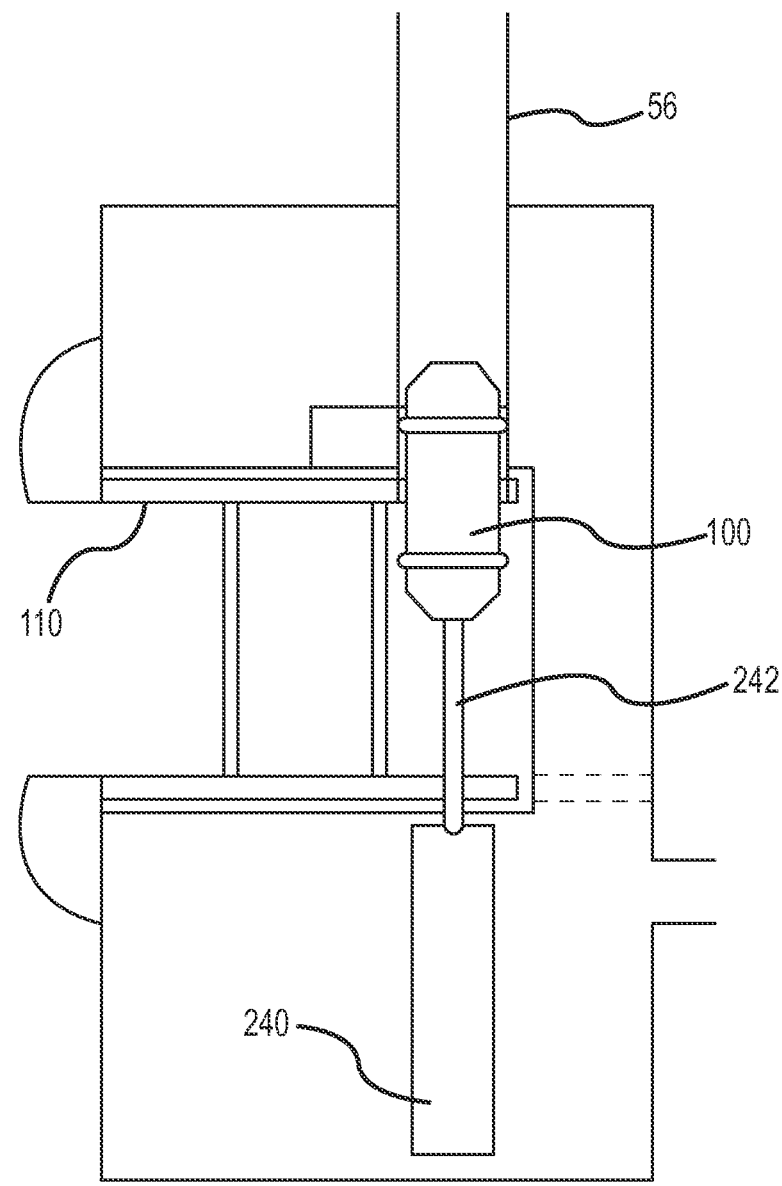
Figure 13C:
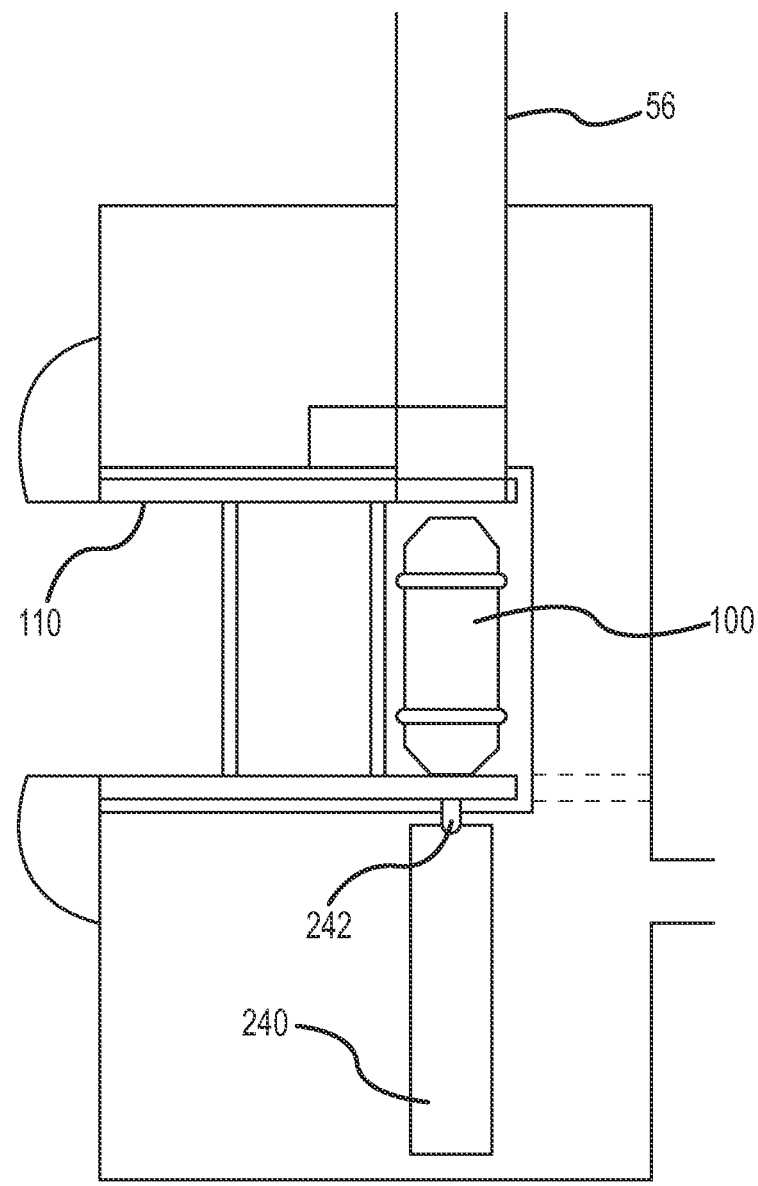

FIGS. 13A-13C illustrate a further aspect the may be utilized with the stations disclosed above. As illustrated, the station 16 of FIGS. 13A-C are exemplary cross-sectional views (not to scale) of a multi-dock carrier station. In this embodiment, the station 16 further includes a linear actuator 240 disposed below the carriage 110. A shaft 242 of the linear actuator 240 is operative to extend through an aperture in the bottom of the carriage 110 and extend to a location near and or through the top end of the carriage 110. Any appropriate actuator may be utilized including electronic, hydraulic and pneumatic. In any arrangement, the linear actuator 240 may be utilized to controllably lower a carrier 100 into the station. For instance, as shown in FIG. 13A, a carrier 100 is received by the station 16 and may be located at a slide plate above the carriage 110. At this time, the shaft 242 of the linear actuator 240 may extend through the carriage to a point where it is proximate to a bottom edge of the carrier 100. The slide plate (not shown) may be opened such that the carrier 100 contacts the end of the shaft 242 of the linear actuator 240. At this time, the linear actuator 240 may be utilized lower the carrier 100 into the carriage 110. See FIG. 13B. The shaft 242 may be retracted until a carrier is located within the dock of the carriage 110. See FIG. 13C. Further, the shaft 242 may be retracted to position that allows the carriage 110 to rotate. As will be appreciated, such functionality may allow for reducing impact forces applied to the carrier and or its contents.

The linear actuator 242 may be utilized for a further important benefit. Specifically, the linear actuator may be utilized to launch a carrier 100 into the pneumatic tube system. That is, the process described above in relation to FIGS. 13A-C may be reversed. In this regard, the carrier 100 may be loaded into a station 16 and rotated to a location aligned with the dispatch tube 56. See FIG. 13C. The linear actuator may extend the shaft 242 to engage the bottom of the carrier and move the carrier into the dispatch tube as illustrated in FIGS. 13B and 13A. Importantly, this allows for moving heavy carriers into the pneumatic tube 56. That is, previous systems may not have had enough vacuum force to lift heavy carriers. Further, momentum may be applied to the carrier. That is, the shaft and actuator may apply significant force to the carrier to begin its movement into the pneumatic tube allowing for transporting of heavier loads as the vacuum within the tube 56 may be sufficient to move the heavier carrier once movement is initiated.

Figure 14:
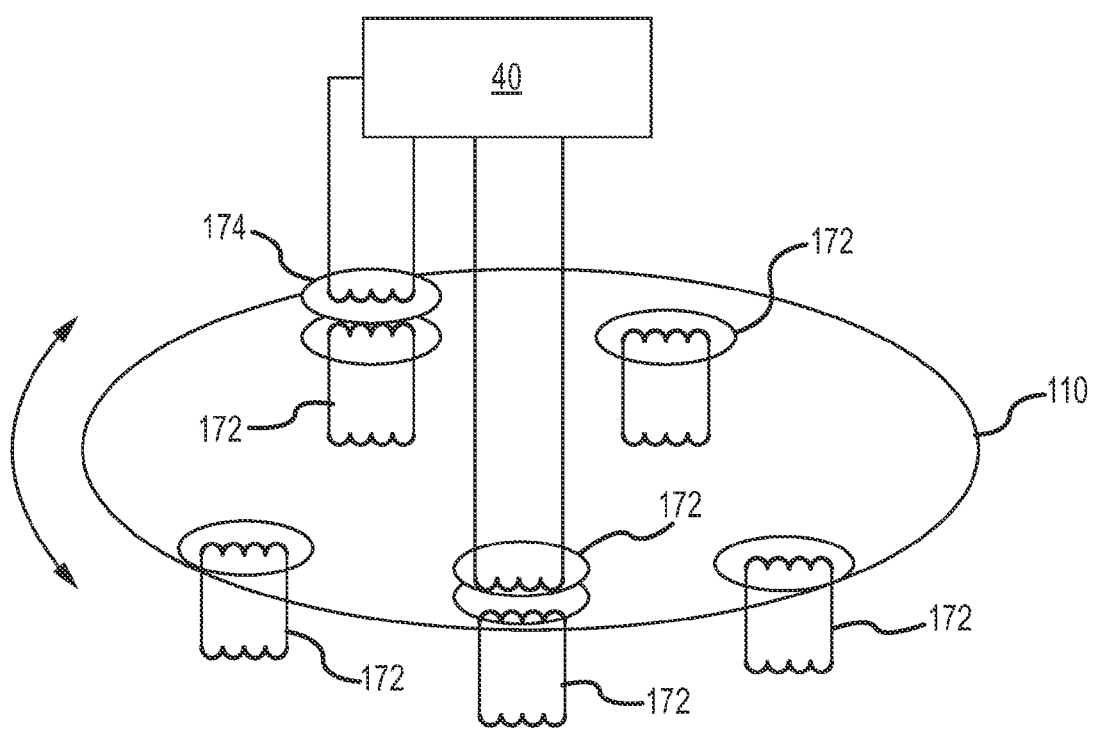
FIG. 14 illustrates split core RFID readers utilized with the multi-dock carrier station.

In order to identify the carries received from the PTS and inserted by users, the station 16 includes various sensors. In one embodiment, the sensors include an identification devices/antenna reader 40, which in one embodiment are RFID sensors/antennas that are operative to energize RFID chips on carriers or disposed within carriers (e.g., attached to carrier contents). Due to the use of the rotating carriage 110, split air transformers 170 are utilized in one embodiment as illustrated in FIG. 14. As shown, each carrier dock of the carriage includes a half transformer 172. In contrast, the station includes only two additional half transformers 174, which are fixedly attached proximate to the access opening and the pneumatic port. In use, the reader 40 is operative to energize either or both of the fixed half transformers to read identification elements disposed on carrier as they are received (i.e., via the pneumatic port or access opening) and/or before carriers are dispatched via the pneumatic port or prior to opening an access door to allow access to a receiving user. When a carriage transformer 172 is rotated into alignment with a station transformer 174, a small air gap exists between the transformers. The air gap is sized to allow electromagnetic induction between the adjacent transformers. That is, the station transformer 174 powers the carriage transformer, which may energize an RFID element on or within the carrier. The use of split air core transformers replaces rotating contact rings, which are subject to corrosion and dust.

In all embodiments, the carousel/carriage stations may include various sensors and locks that allow for determining the orientation of the carriage and/or locking the carriage in a desired position. Further the stations may include carrier presence sensors that allow for identifying if a carrier dock is empty or occupied by a carrier. Further, the carrier docks may include backlighting. Likewise the station may include various visual indicators (e.g., color coded) that allow a user to determine status of the station from a distance. In a variation of the above embodiments. The walls separating the carrier docks may be made of flexible materials to further reduce the potential for pinching a user.

In one arrangement, the internal carriage components of the station are sized to fit within a housing of an existing station. For instance, the carriage components of FIGS. 8 and 9 may be sized to fit within a housing of a prior art station such as illustrated in FIGS. 4A and 4B. In this regard, a novel application is providing a kit and retrofitting an existing station to utilize a multi-dock station.

The foregoing description has been presented for purposes of illustration and description. Furthermore, the description is not intended to limit the invention to the form disclosed herein. Consequently, variations and modifications commensurate with the above teachings, and skill and knowledge of the relevant art, are within the scope of the various embodiments. The embodiments described hereinabove are further intended to explain best modes known of practicing the invention and to enable others skilled in the art to utilize the invention in such, or other embodiments and with various modifications required by the particular application(s) or use(s) of the various embodiments. It is intended that the appended claims be construed to include alternative embodiments to the extent permitted by the prior art.

The invention claimed is:

1. A dispatch/receive station for a pneumatic tube system, the station comprising:
   a housing;
   a pneumatic port connected to said housing for receiving carriers and dispatching carriers to the pneumatic tube system;
   a carriage, disposed at least partially within said housing, having a plurality of carrier docks spaced about a central axis of said carriage, wherein said carriage comprises:
      an upper rim having a plurality of openings spaced about said central axis of said carriage, each opening defining an upper end of one of said plurality of carrier docks;
      a lower rim spaced from said upper rim and having a plurality of recesses spaced about said central axis of said carriage, each recess defining a lower end of one of said plurality of carrier docks; and
      a plurality of dividers disposed between each adjacent pair of carrier docks, wherein each divider extends over a portion of the distance between said upper rim and said lower rim and over a portion of a distance between said central axis and a radial outer edge of said carriage, wherein said carriage is configured to rotate about said central axis to selectively align any one of said plurality of carrier docks with said pneumatic port for receiving or dispatching a pneumatic carrier; and
   an access opening in said housing, wherein said access opening is sized to permit access to a single one of said plurality of carrier docks rotated into alignment with said access opening, wherein said access opening and said pneumatic port are offset to align with first and second different carrier docks of said carriage.

2. The station claim 1, further comprising:
   an access door, wherein said access door is operative to move between a first position at least partially covering said access opening and a second position more fully exposing said access opening.

3. The station of claim 2, wherein, in said first position said access door is positioned to prevent insertion or removal of the carrier through said access opening and in said second position said access door is positioned to permit insertion or removal and of the carrier through said access opening.

4. The station of claim 1, wherein said carrier docks are at equal angular spacing about said central axis of said carriage.

5. The station of claim 4, wherein each of said plurality of carrier docks define a generally cylindrical area between said upper end and said lower end, wherein said generally cylindrical area is sized to hold the pneumatic carrier.

6. The station of claim 5, wherein each of said plurality of carrier docks includes an at an least partially closed radially interior portion between said open top end and said closed bottom end and an at least partially open radially exterior portion between said open top end and said closed bottom end, wherein said at least partially open radially exterior portion is sized to permit insertion or removal of the carrier into or out of the carrier dock when the carrier dock is aligned with the access opening.

7. The station of claim 1, wherein said dividers, in conjunction with a sizing of said access opening, prevent removal of a carrier from any one of said plurality of carrier docks that is non-aligned with said access opening.

8. The station of claim 7, wherein a radially outward portion of each of said plurality of carrier docks between said upper rim and said lower rim is open to allow insertion of carriers into said carrier docks or removal of the carrier from said carrier docks.

9. The station of claim 1, further comprising:
a linear actuator aligned with said pneumatic port, wherein said linear actuator has an end that is configured to move from a retracted position below said carriage to an extended position proximate to said pneumatic port at an upper end of said carriage, wherein said linear actuator extends through one of said plurality of carrier docks aligned with said pneumatic port in said extended position.

10. The station of claim 1 further comprising:
at least one plenum disposed between said housing and said carriage, wherein said plenum at least partially fluidly isolates said carriage and said plurality of carrier docks from an internal area of said housing; and
a valve disposed in-line with said pneumatic port, wherein said valve moves between an open configuration where air for the pneumatic tube system is drawn or exhausted air through said internal area of said housing and a closed configuration wherein air for the pneumatic tube system is drawn or exhausted through said carriage and said access opening.

11. The station of claim 10 further comprising:
an air conduit connecting said internal area of said housing to an air source.

12. The station of claim 11, further comprising:
an air filter, wherein air drawn or exhausted through said internal area of said housing passes through said air filter.

13. A dispatch/receive station for a pneumatic tube system, the station comprising:
a housing having an internal area;
a pneumatic port attached to said housing for receiving carriers from and dispatching carriers to the pneumatic tube system;
a plurality of carrier docks disposed within said housing and configured to rotate about a common central axis, wherein:
each carrier dock sized to receive a pneumatic carrier between a bottom end and a top end; and
each carrier dock has an open radially outward portion, relative to said central axis, that extends over at least a portion of a distance between said bottom end and said top end;
an access opening in said housing, wherein said access opening is sized to permit access to one open radially outward portion of one carrier dock aligned with said access opening, wherein said access opening and said pneumatic port are offset to align with first and second different ones of said plurality of carrier docks; and an actuator operative to rotate said plurality of carrier dock about said central axis to selectively align one of said carrier docks with said pneumatic port or said access opening.

14. The system of claim 13, further comprising:
a user interface configured to receive inputs from a user of the pneumatic tube system;
at least one communication device configured to read an identifier disposed on or within a pneumatic carrier located within one of said plurality of carrier docks; and
a controller in signal communication with said user interface and said at least one communication device, said controller configured to control operation of at least one of said station and the pneumatic tube system.

15. The system of claim 13, further comprising:
an access door, wherein said access door is operative to move between a first position at least partially covering said access opening and a second position more fully exposing said access opening.

16. The station of claim 15, wherein, in said first position said access door is positioned to prevent insertion or removal of the pneumatic carrier through said access opening and in said second position said access door is positioned to permit insertion or removal and of the pneumatic carrier through said access opening.

17. A dispatch/receive station for a pneumatic tube system, the station comprising:
a housing;
a pneumatic port connected to said housing for receiving carriers and dispatching carriers to the pneumatic tube system;
a carriage, disposed at least partially within said housing, having a plurality of carrier docks spaced about a central axis of said carriage, wherein said carriage is configured to rotate about said central axis to selectively align any one of said plurality of carrier docks with said pneumatic port for receiving or dispatching a pneumatic carrier;
an access opening in said housing, wherein said access opening is sized to permit access to a single one of said plurality of carrier docks rotated into alignment with said access opening, wherein said access opening and said pneumatic port are offset to align with first and second different carrier docks of said carriage;
at least one plenum disposed between said housing and said carriage, wherein said plenum at least partially fluidly isolates said carriage and said plurality of carrier docks from an internal area of said housing; and
a valve disposed in-line with said pneumatic port, wherein said valve moves between an open configuration where air for the pneumatic tube system is drawn or exhausted air through said internal area of said housing and a closed configuration wherein air for the pneumatic tube system is drawn or exhausted through said carriage and said access opening.

18. The station of claim 17 further comprising:
an air conduit connecting said internal area of said housing to an air source.

19. The station of claim 17, further comprising:
an air filter, wherein air drawn or exhausted through said internal area of said housing passes through said air filter.

* * * * *